US007703018B2

(12) United States Patent
Chaudhry et al.

(10) Patent No.: US 7,703,018 B2
(45) Date of Patent: Apr. 20, 2010

(54) APPARATUS AND METHOD FOR AUTOMATING THE DIAGRAMMING OF VIRTUAL LOCAL AREA NETWORKS

(75) Inventors: Muhammad Ammar Chaudhry, Naperville, IL (US); Kurtis Paul Longnecker, Plainfield, IL (US); Regina Mack, Raleigh, NC (US); Joshua Edward Ochs, Woodridge, IL (US); Walter F. Schmidt, Darien, IL (US)

(73) Assignee: International Business Machines Corporation, Armonk, NY (US)

( * ) Notice: Subject to any disclaimer, the term of this patent is extended or adjusted under 35 U.S.C. 154(b) by 1962 days.

(21) Appl. No.: 10/443,671

(22) Filed: May 22, 2003

(65) Prior Publication Data

US 2004/0233234 A1  Nov. 25, 2004

(51) Int. Cl.
*G06K 15/00* (2006.01)
(52) U.S. Cl. ........................................ 715/735; 715/770
(58) Field of Classification Search ......... 715/770–773, 715/970, 721, 765, 734, 735, 736–738, 741, 715/853–855, 745, 780, 826, 839; 717/104, 717/103; 707/104; 370/400
See application file for complete search history.

(56) References Cited

U.S. PATENT DOCUMENTS

| 5,809,282 | A | | 9/1998 | Cooper et al. ............... 395/500 |
| 6,028,602 | A | * | 2/2000 | Weidenfeller et al. ....... 715/781 |
| 6,225,999 | B1 | | 5/2001 | Jain et al. .................... 345/356 |
| 6,239,813 | B1 | | 5/2001 | Erskine ....................... 345/440 |
| 6,393,425 | B1 | | 5/2002 | Kelly .......................... 707/100 |
| 6,594,673 | B1 | * | 7/2003 | Smith et al. ............... 707/104.1 |
| 6,862,280 | B1 | * | 3/2005 | Bertagna .................... 370/392 |
| 6,982,955 | B1 | * | 1/2006 | Marshall et al. ............. 370/230 |
| 7,162,510 | B2 | * | 1/2007 | Jammes ...................... 709/203 |
| 2002/0097730 | A1 | * | 7/2002 | Langille et al. ............. 370/401 |
| 2002/0188584 | A1 | * | 12/2002 | Ghannam et al. .............. 707/1 |
| 2003/0101023 | A1 | * | 5/2003 | Shah et al. .................. 702/186 |
| 2003/0101025 | A1 | * | 5/2003 | Shah et al. .................. 702/188 |
| 2003/0137937 | A1 | * | 7/2003 | Tsukishima et al. ......... 370/230 |
| 2004/0024573 | A1 | * | 2/2004 | Allen et al. ................. 702/189 |
| 2004/0071147 | A1 | * | 4/2004 | Roadknight et al. ......... 370/400 |

(Continued)

*Primary Examiner*—Steven P Sax
(74) *Attorney, Agent, or Firm*—Yee & Associates, P.C.; William H. Steinberg; Rudolf O. Siegesmund

(57) ABSTRACT

The Design Tool of the present invention discloses an apparatus and method for automating the drawing sequence of Microsoft Visio® to produce a diagram of a network solution. The Design Tool reduces device selections to a series of automatically generated instructions that control Microsoft Visio®. The apparatus and method of the Design Tool accomplish this result by causing the TSA to define custom VLANs and to configure custom connectivity groups (VLAN Groups). Using the Design Tool, the TSA (or other user) activates a series of graphical user interfaces providing access to available virtual local area networks, configured virtual local area network groups, available primary devices and available related devices. By providing input to the graphical user interfaces, the TSA defines configured virtual local area networks, configured virtual local area network groups, configured primary devices and configured related devices for the TSA's network solution. Responsive to receiving the input, the Design Tool instructs the drawing program to create a diagram of the network solution containing the configured primary devices and the configured related devices. Connectivity for each configured primary device and each configured related device is defined by a virtual local area network group identification created as part of the input.

64 Claims, 37 Drawing Sheets

U.S. PATENT DOCUMENTS

2004/0122645 A1* 6/2004 Shevenell et al. ............. 703/21
2004/0181686 A1* 9/2004 Krause et al. ............... 713/201
2004/0210623 A1* 10/2004 Hydrie et al. ............... 709/201
2004/0221003 A1* 11/2004 Steele et al. ................ 709/203
2007/0027968 A1* 2/2007 Price et al. .................. 709/220

* cited by examiner

FIG. 19

Add New Devices 1900

1910 1904 1912 1914 1916 1918 1920

Configure Primary Device | Configure Related Devices | Edit Configuration File | Device Notes | Tips Selected Device's
This device typically pulls 330-500 watts from the primary plug. The second plug is primarily for redundancy. — 1922

| Operating System | None |
| KVM Ports | 0 |
| Cluster Software | None |
| Bandwidth Increment | 8 |
| Bandwidth | None |
| Burstable | No |
| Burst Increment | 8 |
| Burst | None |

1924

General Specs
Physical Specs
− Electrical Specs — 1926
  Watts/PS | 645

1928

Watts/PS
Enter the power consumption of one power supply in Watts. Editing this property will cause Amps/Plug to be recalculated.

Available Devices: 490 — 1942

| Description — 1944 | 1946 — Manufacturer |
|---|---|
| pSeries 610-6C1 (7028-6C1) Entry Rack Servers | IBM |
| pSeries 610-6E1 (7028-6E1) Entry Tower Servers | IBM |
| pSeries 620 (7025-6F0) Entry Tower Servers 1948 | IBM |
| pSeries 620 (7025-6F1) Entry Tower Servers | IBM |
| pSeries 630 (7028-6C4) Entry Rack Servers 1940 | IBM |
| pSeries 630 (7028-6E4) Entry Tower Servers | IBM |
| pSeries 640 (7026-B80) Entry Rack Servers | IBM |
| pSeries 660 (7026-6H0) Midrange Unix Servers | IBM |
| pSeries 660 (7026-6H1) Midrange Unix Servers | IBM |
| pSeries 660 (7026-6M1) Midrange Unix Servers | IBM |
| RS/6000 Enterprise Server Model M80 Enterprise Ser | IBM |
| pSeries 670 (7040-671) CEC Midrange Unix Servers | IBM |

1950 1952 1954

Category Filter: All Categories    Search Criteria:

Retrieve Item   Add   Apply   Reset
1962   1964   1966

Close 1960

APPARATUS AND METHOD FOR AUTOMATING THE DIAGRAMMING OF VIRTUAL LOCAL AREA NETWORKS

CROSS REFERENCE TO RELATED APPLICATION

This application is related to U.S. patent application Ser. No. 10/142,605, "Technical Solution Architect Power Distribution Tool" filed on May 9, 2002.

FIELD OF THE INVENTION

The present invention is directed to the field of software designed to present documentation and illustration of network, web site, database and software solutions, and more particularly to the field of software designed to automate the drawing process of a separate drawing program in order to produce a diagram of a network solution.

BACKGROUND OF THE INVENTION

Virtual Local Area Networks (VLAN) are networks of physically separate components that function as though each segment was on a common Local Area Network (LAN). The VLAN component connections are configured by software rather than hardware. VLANs have created a need for network designs that seek to make the best use of available equipment. One name that has been given the person who works on such network designs is the Technical Solutions Architect (TSA). The TSA is tasked with configuring and maintaining the many elements of computer equipment required by companies for their networking requirements. These elements include VLANs such as Internet Access—Transit, Firewalled Internet Access, Load Balanced Internal, Data Resource, Data Admin and Backend Access—Transit. These VLANs are configured into groups such as Web Server Access, Load Balanced Web Server Access, Load Balancer Access, Data Server Access, Front Firewall Access and Back Firewall Access. Hardware devices that are needed in these networks include servers, firewalls, load balancers, and intrusion detection devices. The TSA configures the VLANs and hardware devices to create a network that meets business needs of the client called a network solution. IBM Universal Server Farm (USF) is a set of outsourcing sites run by IBM. Server technology from multiple different vendors is operated by IBM on behalf of clients. These are then networked to the company's own datacenter for backend order processing. IBM USF Version 5 e-Business Hosting Solutions is used by TSAs to create the virtual networks to meet the client needs. One of the tools in creating the solution is the diagramming of the virtual networks showing the connectivity of the various hardware devices. Microsoft Visio® is used to perform the diagramming. A need existed to perform validations on the TSA's selections and entries to make certain that the correct type of networking hardware was present in the solution and that the network device configurations are properly illustrated. An additional need existed to reduce diagramming time. A further need existed to achieve greater solution accuracy and uniformity.

U.S. Pat. No. 6,239,813 (the '813 patent) discloses a method of defining and manipulating an intelligent symbol so that connections between symbols can be readily added and edited. Existing software automates the manipulation and interconnection of symbols so that when one symbol's position is changed, all connections and/or symbols associated with that symbol are reconfigured to maintain the association. Symbols and connections that automatically reconfigure are referred to as "intelligent" or "smart" symbols. The '813 patent is directed toward the specific problem of improving graphical methods for editing and displaying connection point locations for intelligent symbols.

U.S. Pat. No. 6,225,999 (the '999 patent) discloses a graphical user interface that allows a user to display only a limited number of total network components while removing undesirable or unnecessary data, and to dynamically control the display of information by expanding the display to include previously un-selected components that are logically connected to the selected components.

U.S. Pat. No. 6,393,425 (the '425 patent) discloses a diagramming method that automatically controls the construction of the network diagram based on specific guidance from the user. The diagramming program uses the information obtained from an automatic interrogation of the network, and selectively diagrams portions of the network. The diagram includes connectivity and device-specific interface information.

SUMMARY OF THE INVENTION

The Design Tool of the present invention meets the needs identified above by providing an apparatus and method for automating the drawing sequence of Microsoft Visio® to produce a diagram of a network solution. The Design Tool reduces device selections to a series of automatically generated instructions that control Microsoft Visio®. The apparatus and method of the Design Tool accomplish this result by causing the TSA to define custom VLANs and to configure custom connectivity groups (VLAN Groups). Using the Design Tool, the TSA (or other user) activates a series of graphical user interfaces providing access to available virtual local area networks, configured virtual local area network groups, available primary devices and available related devices. By providing input to the graphical user interfaces, the TSA defines configured virtual local area networks, configured virtual local area network groups, configured primary devices and configured related devices for the TSA's network solution. Responsive to receiving the input, the Design Tool instructs the drawing program to create a diagram of the network solution containing the configured primary devices and the configured related devices. Connectivity for each configured primary device and each configured related device is defined by a virtual area local network group identification created as part of the input.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 19 depicts the Add New Devices Screen at the Configure Primary Device Tab

DETAILED DESCRIPTION OF THE PREFERRED EMBODIMENT

Figure 1:
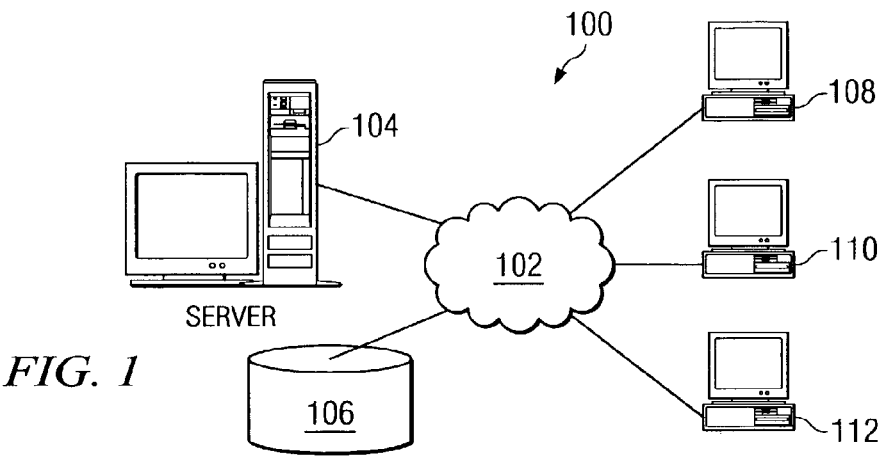
FIG. 1 depicts a typical system for implementing the design tool.

FIG. 1 depicts a network in which the design tool may be implemented. Computer network 100 comprises local machines 108 electronically connected to first remote machine 110, second remote machine 112, server 104 and database 106 via network 102. Network 102 may be a simplified network connection such as a local area network (LAN) or may be larger network such as a wide area network (WAN) or the Internet. Computer network 100 is intended as an example of a computer network and is not meant as an architectural limitation.

Figure 2:
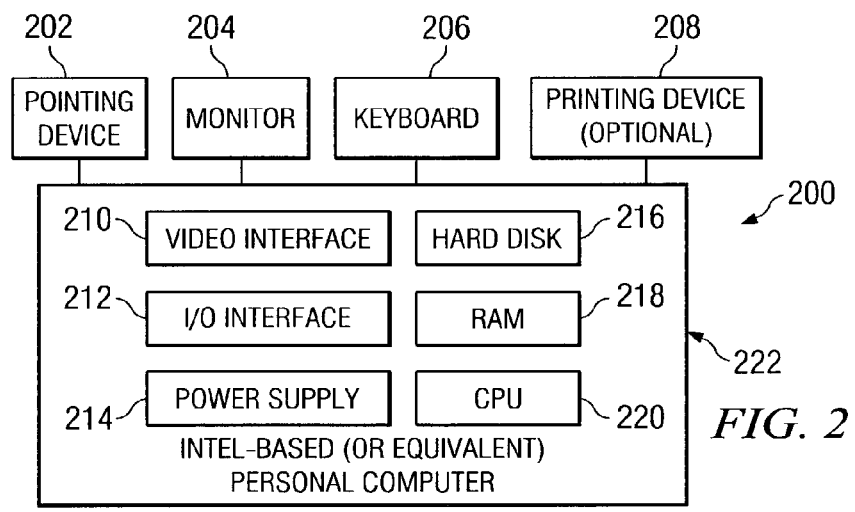
FIG. 2 depicts a network in which the design tool may be implemented.

FIG. 2 depicts Computer 200 for implementing the Design Tool. Computer 200 has Chassis 222 connected to Central Processing Unit (CPU) 220, Random Access Memory (RAM) 218, Hard Disk 216, Video Interface 210, Input/Output Interface 212, Power Supply 214, Pointing Device 202, Monitor 204, Keyboard 206 and Printing Device 208. In the preferred embodiment, Hard Disk 216 must have a minimum of 10 MB of free space, RAM 218 must have at least 128 MB, Monitor 204 and Video Interface 210 must allow for at least 800×600 screen resolution and at least 16K high color video. In order to implement the present invention, Computer 200 needs a browser program, a drawing program and an operating system as well as the Design Tool program. In the preferred embodiment of the Design Tool, the browser program is Internet Explorer® 4.01 or later, and the drawing program is Microsoft Visio®. Optionally, Computer 200 may require IBM TSA Power Distribution Tool version 2.0.22 or higher (hereafter, the "Power Distribution Tool"). It is not a requirement that Computer 200 be connected to the Internet for the Design Tool to operate. In the preferred embodiment, the Design Tool only needs functionality of components from a browser program's accompanying files, such as the accompanying files of Internet Explorer®. Therefore, the design tool may operate in a stand alone computer such as Computer 200 and may also operate in a network such as network 100 where some components of the Design Tool may be distributed at local, remote and/or server machines.

Figure 3:
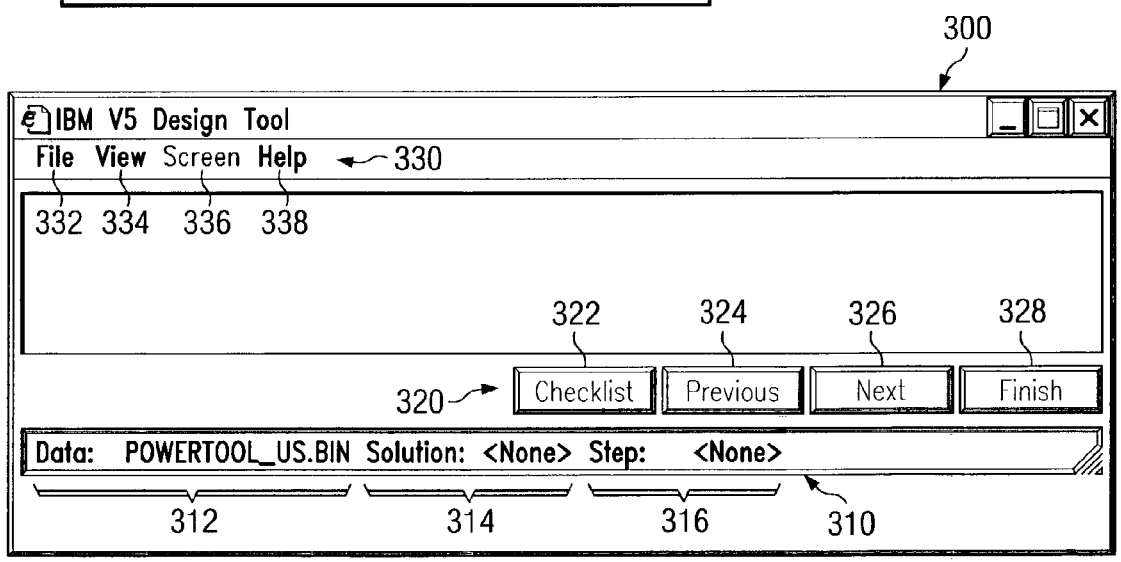
FIG. 3 depicts the MDI Shell.

FIG. 3 depicts Shell 300. Shell 300 has four drop down menu buttons: File 332, View 334, Screen 336, and Help 338. In addition, Shell 300 has Checklist Button 322, Previous Button 324, Next Button 326 and Finish Button 328. The drop down menus and Next Button 324 and Previous Button 326 enable the user to navigate through the Design Tool. Using either the navigation buttons or the menu, the user can move from one step to the next or skip steps. Each step is represented by a unique screen consisting of one or more pages. Page to page navigation is performed by the user selecting tabs (described later). Status Bar 310 displays current data file name 312, current solution file name 314 and current step number 316. When optional use of the Power Distribution Tool is desired, the user must load a file with a BIN file extension so that the data file used by the Design Tool will have the same file name as the data file for the Power Distribution Tool. Thus, data file name 312 is shown as "POWER-TOOL-US.BIN" and will permit the Design Tool to insert the correct data file name into an export file that will be used by the Power Distribution Tool.

Figure 4:
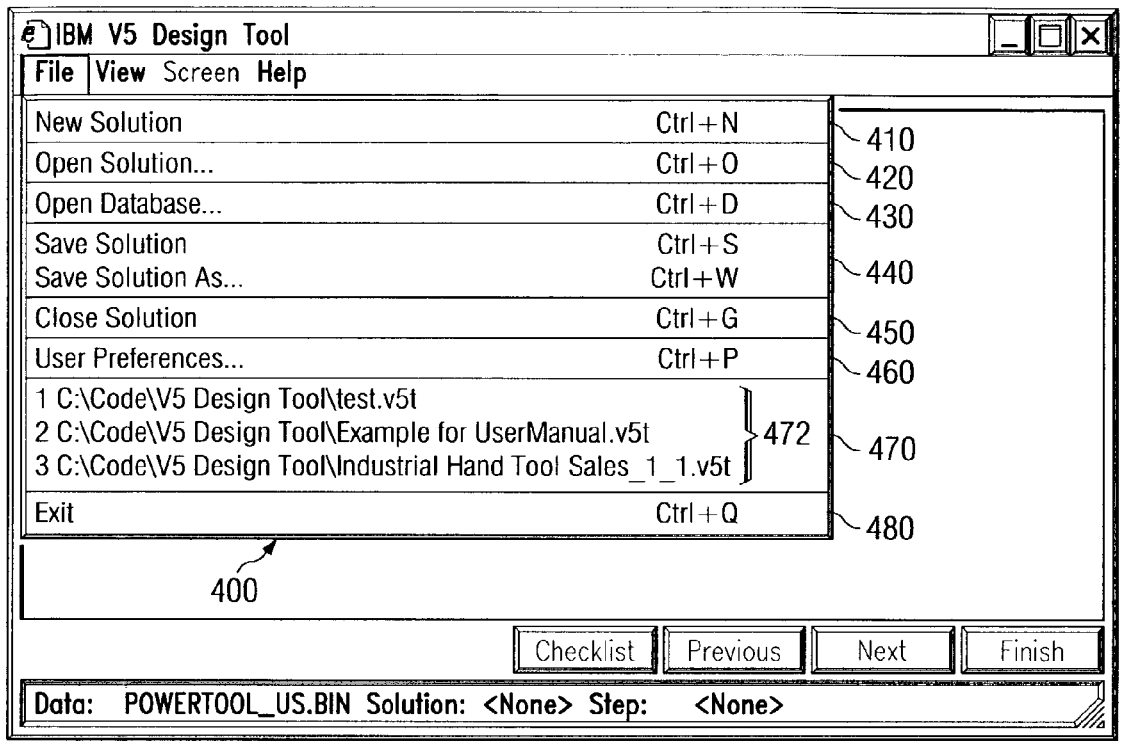
FIG. 4 depicts the MDI Shell with File drop down menu.

FIG. 4 depicts MDI Shell 300 with File Menu 400. File Menu 400 provides the following selections: New Solution 410, Open Solution 420; Open Database 430, Save options 440 (Save Solution and Save Solution As), Close Solution 450, User Preferences 460, File List 470, and Exit 480.

Figure 5:
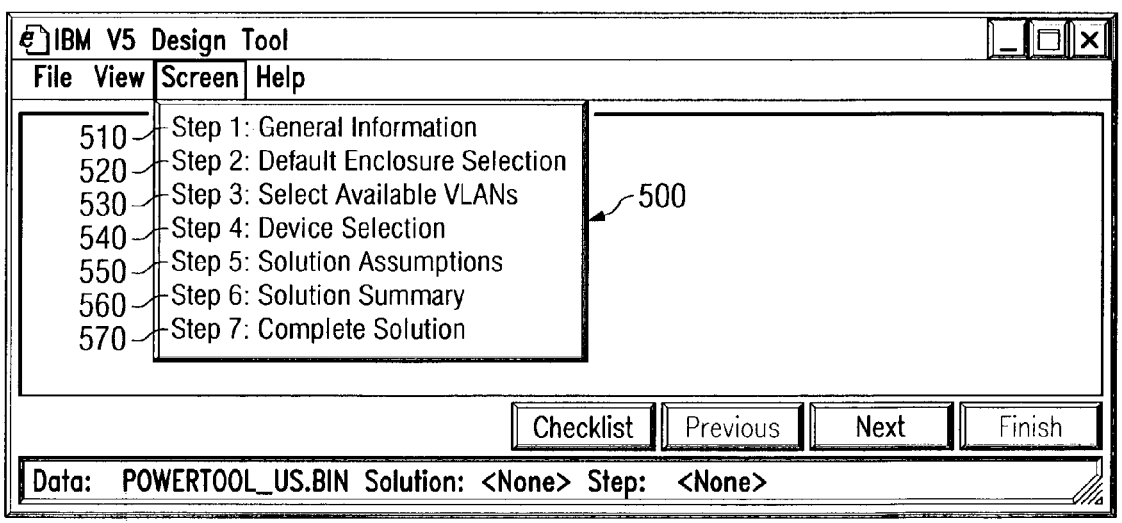
FIG. 5 depicts the MDI Shell with the Screen drop down menu.

FIG. 5 depicts MDI Shell 300 with Screen menu 500. The Design Tool consists of a series of seven (7) steps, each represented by a particular interface screen. MDI Shell 300 surrounds the steps and provides common functionality at every step such as step-to-step navigation and menus. The user may select Step 1: General Information 510, Step 2: Default Enclosure Selection 520, Step 3: Select Available VLANs 530, Step 4: Device Selection 540, Step 5: Solution Assumptions 550, Step 6: Solution Summary 560; or Step 7: Complete Solution 570.

Figure 6:
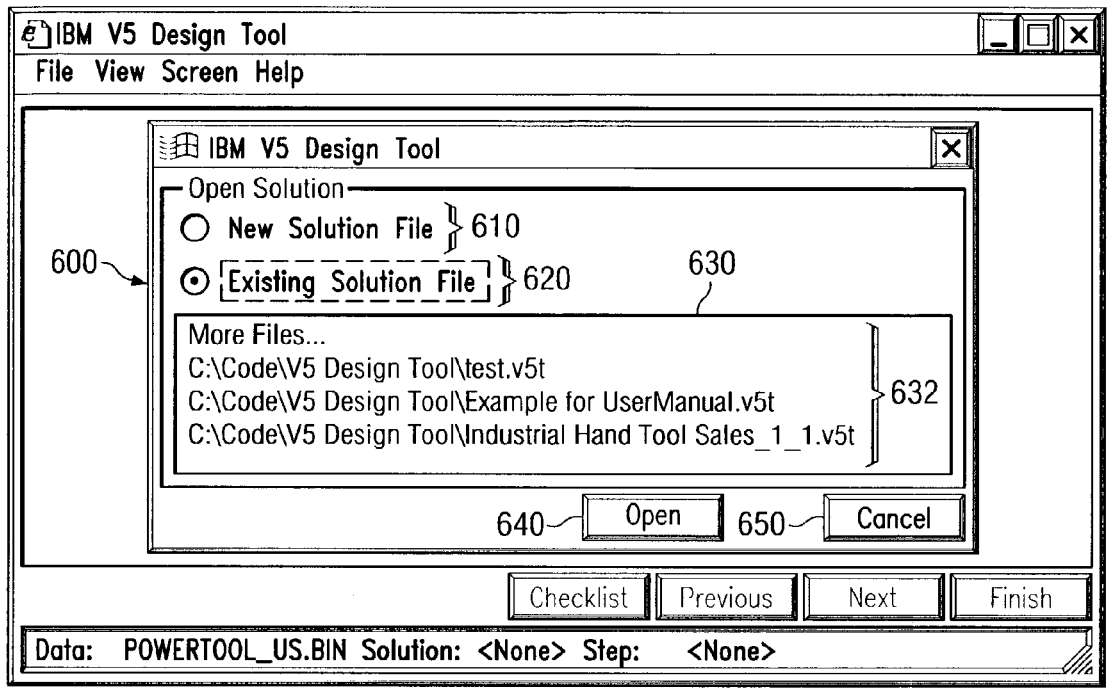
FIG. 6 depicts the Solution Screen.

FIG. 6 depicts MDI Shell 300 with Solution Browser Screen 600. Solution Browser Screen 600 allows the user to select either New Solution file 610 or Existing Solution File 620. Available files 632 are displayed in Open Solution Window 630. In addition, Open Solution Window 630 has open button 640 and cancel button 650.

The symbol depicted by a circle with an X inside is used in these drawings to depict a junction where two lines meet and does not indicate an operation by itself.

Figure 7:
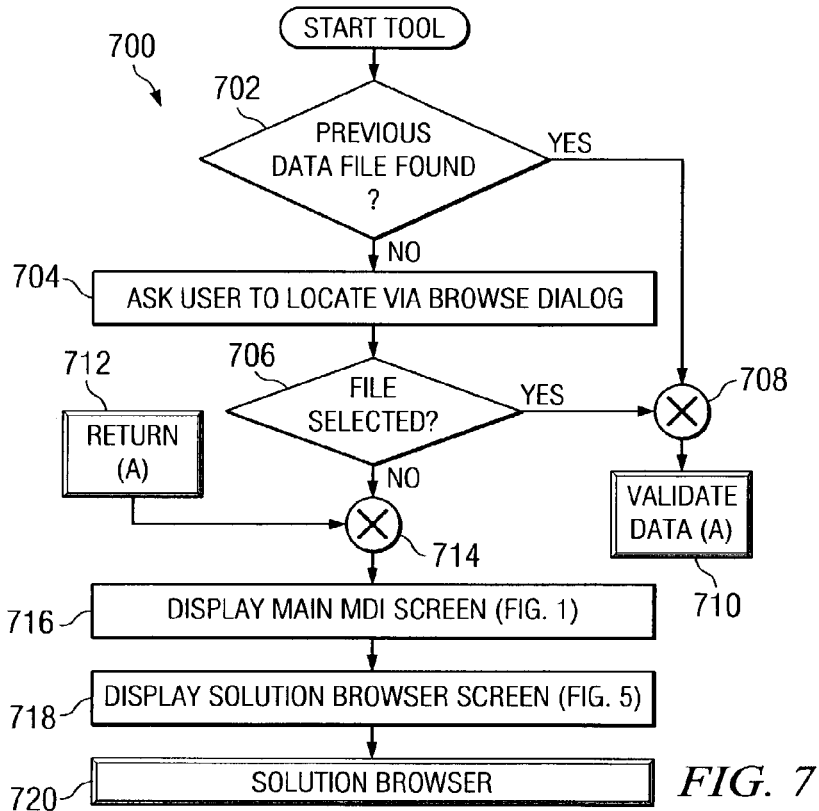
FIG. 7 depicts a flow chart for the Design Tool Startup process.

FIG. 7 depicts a flow chart for Design Tool Startup Sequence (DTSS) 700. DTSS 700 begins and a determination is made as to whether a previous data file has been found (702). If not, a message is displayed asking the user to locate the file via the browse dialog (704) and a determination is made as to whether a file is selected by the user (706). If not, DTSS goes to step 716. At step 702, if a previous data file was found, then DTSS 700 performs a data validation process (710) (see FIG. 9). Next, main MDI Screen 300 (see FIG. 3 is displayed (716) and Solution Browser Screen 600 (see FIG. 6) is displayed (718).

Figure 8:
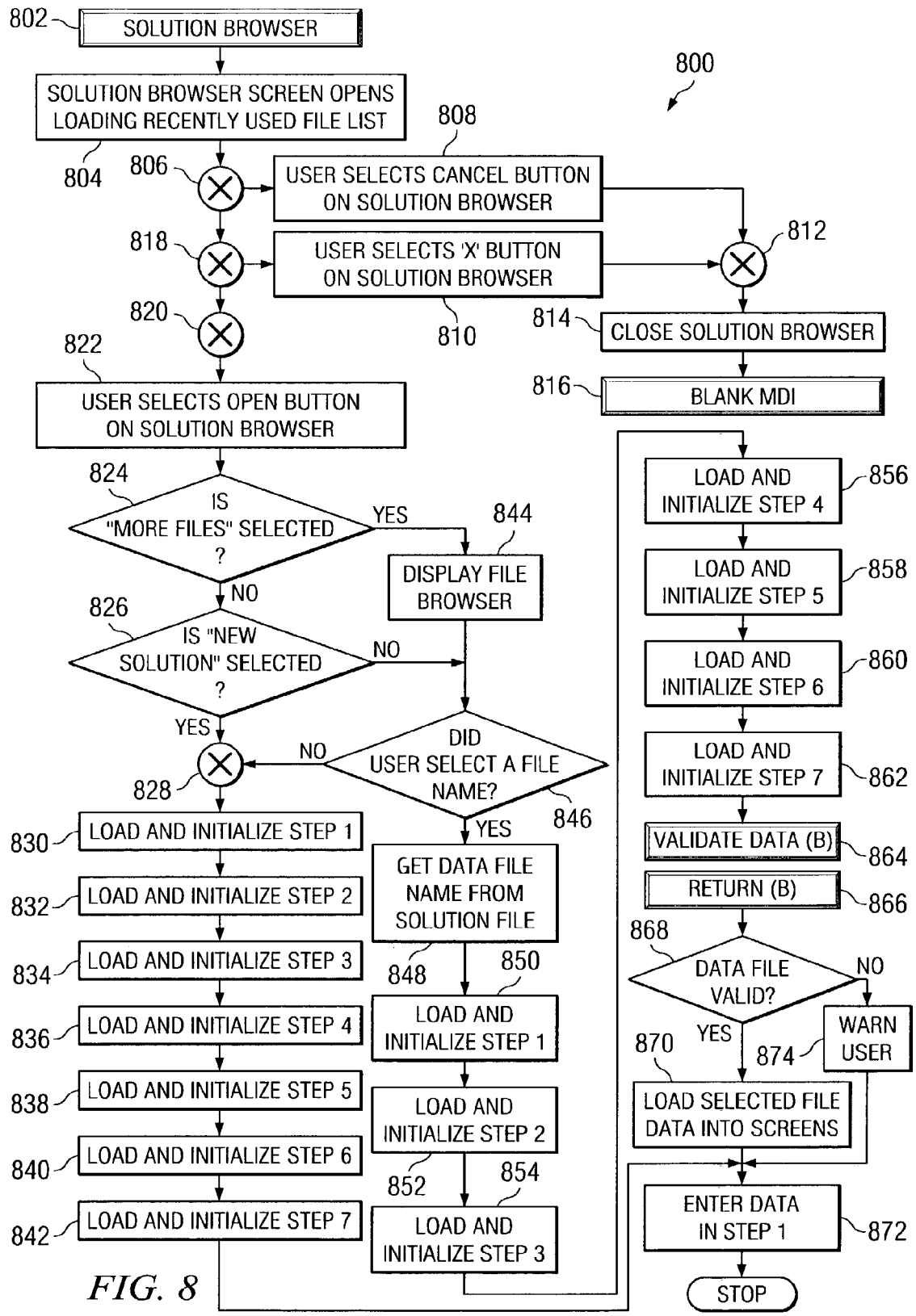
FIG. 8 depicts a flow chart for the Solution Browser process.

FIG. 8 depicts a flow chart of Solution Browser Process 800. Solution Browser Screen 600 (see FIG. 6) opens loading the recently used file list (804). If the user selects cancel button (650) (808) or if the user selects the "X" button on Solution Browser Screen 600, Solution Browser Process 800 browser will close (812) and MDI Shell 300 (see FIG. 3) will be displayed 816. If the user selects Open Button 640 on Solution Browser Screen 600 (822), a determination is made whether the user selected "More Files" (824). If "More Files" has been selected, available files 632 (see FIG. 6) is displayed (844), and a determination is made as to whether the user selected a file name (846). If the user selected a file name, DTSS 300 proceeds to step 848. If not, DTSS 300 proceeds to step 830. If at step 824, "More Files" was not selected, a determination is made as to whether "New Solution" was selected (826). If not, DTSS 300 goes to step 846. If "New Solution" was selected, DTSS 300 goes to step 830. DTSS 300 loads and initializes Step 1 (830), Step 2 (832), Step 3 (834), Step 4 (836), Step 5 (838), Step 6, (840), Step 7 (842) and proceeds to display the screen for Step 1 (872) so that data may be entered.

If at step 846, the user did not select a file name, DTSS 300 proceeds to get the data file name from the solution file (848) and then loads and initializes Step 1 (850), Step 2 (852), Step 3 (854), Step 4 (856), Step 5 (858), Step 6 (860) and Step 7 (862). Next DTSS 300 performs data validation process 900 (see FIG. 9) (864) which is the same as the validation process at step 710 of DTSS 700. Next, a determination is made as to whether the data file is valid (868). If not a warning is displayed to the user (874) and the screen for Step 1 is displayed (870). If it is determined that the date file is valid, DTSS 300 loads the selected file data into the screens (870) and proceeds to display the screen for Step 1 (872).

Figure 9:
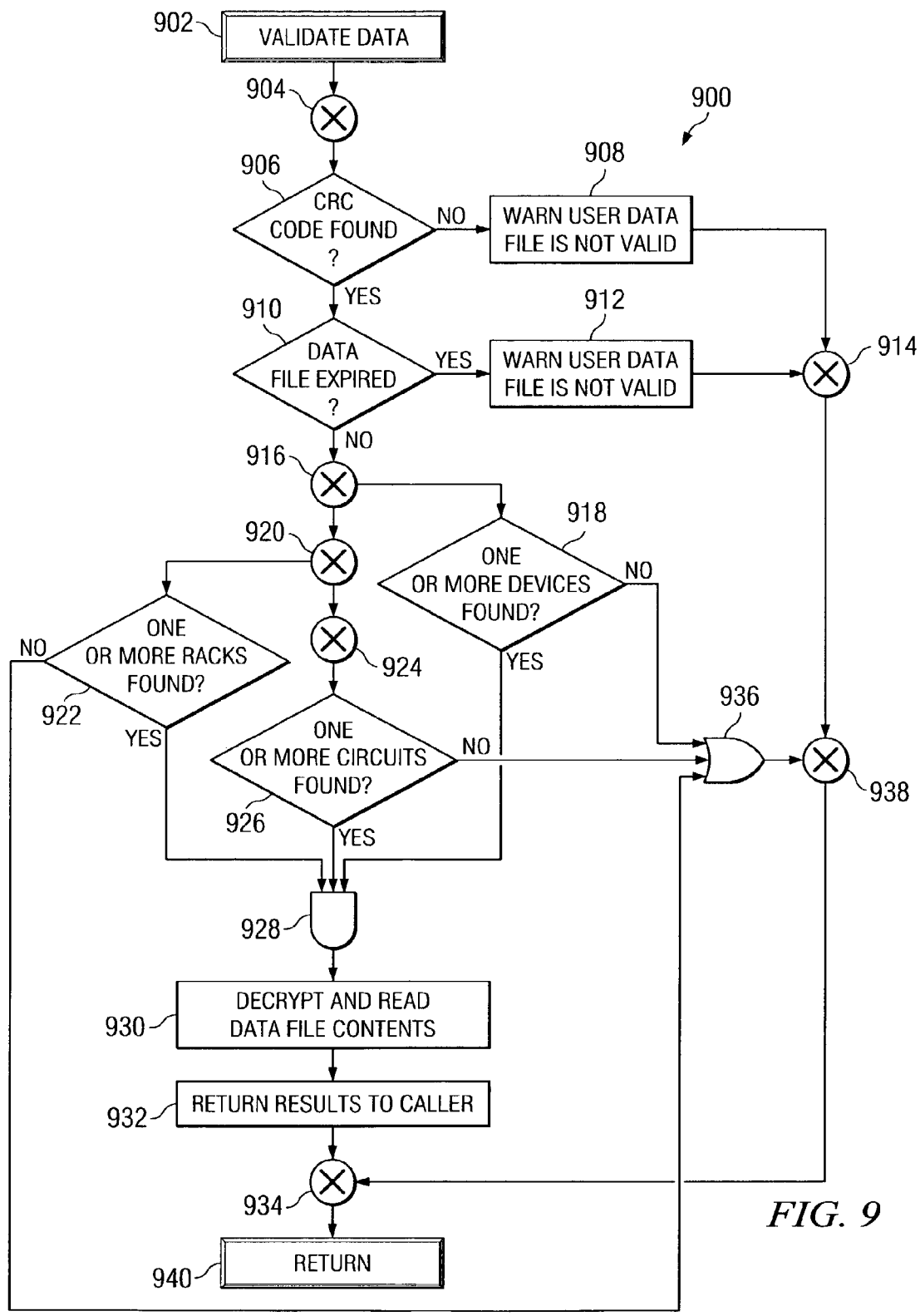
FIG. 9 depicts a flow chart for the Data File Validation Process.

FIG. 9 depicts a flow chart for Data File Validation Process (DVP) 900. DVP 900 begins (902) and determines whether the cyclical redundancy check (CRC) code is found (906). If the CRC code is found, a determination is made as to whether the data file expired (910). If the data file expired, the user is warned that the data file is not valid (912) and proceeds to return (940). If the data file is not expired, a determination is made as to whether one or more devices have been found (918), one or more racks have been found (922), and one or more circuits have been found (924). A determination is made whether one or more devices, one or more racks and one or more circuits have been found (928). If so, DVP 900 decrypts and reads the data file contents (930). The results of reading the data file are returned to the caller (932) and DVP 900 goes to return (940). If one or more devices, one or more racks or one or more circuits have not been found (936), DVP 900 goes to return (940).

Figure 10:
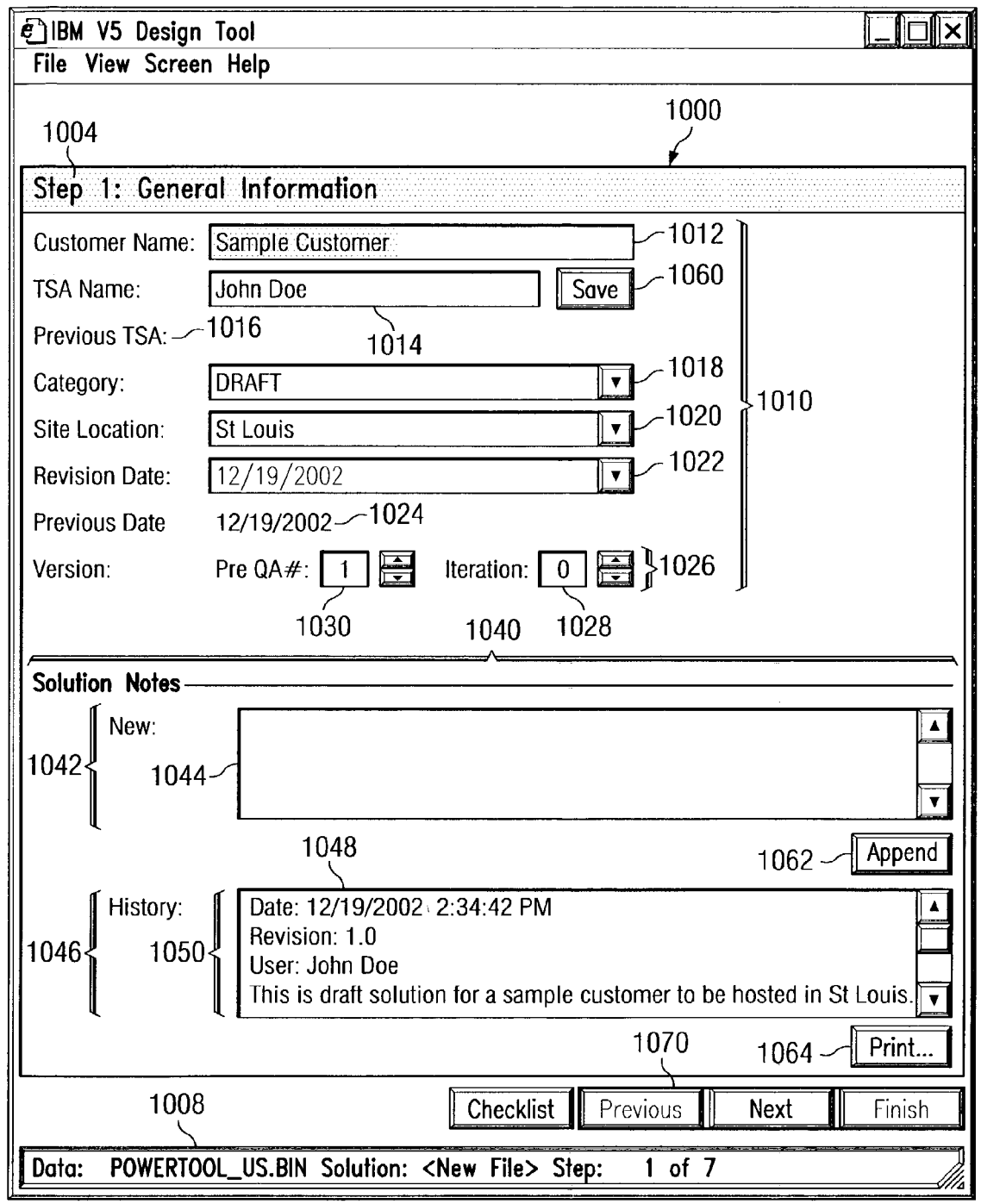
FIG. 10 depicts the General Information Screen.

FIG. 10 depicts General Information Screen (GIS) 1000. GIS 1000 is used to enter Customer Name 1012, Category 1018, Site Location 1020, Revision Date 1022, Pre QA# 1030 and Iteration 1026. GIS 1000 has Solution Notes section 1040 having a New section 1042 and History section 1046. The user may add the information entered in New section 1042 to History section 1046 by clicking Append button 1062. The user may print History Contents 1050 by clicking GIS Print button 1064. If the user fails to enter any of the information on GIS 1000, a prompt is created, and if a prompts exists a warning (not shown) is displayed to the user that it is not alright to proceed to another screen. The solution date field is locked and automatically filled with the computer's current date. Customer Name 1012 is used in conjunction the Version items, Pre QA# 1030 and Iteration 1026 to provide part of the suggested file name for the completed Visio® diagram. Iteration 1026 follows the standard business practice of incrementing the iteration number each time the solution is modified. Once the solution has been reviewed for Quality Assurance, the next solution modification requires that PreQA# 1030 field be incremented, a process that automatically sets Iteration 1026 back to 0. Therefore, the first version after the first Quality Assurance review will be 2.0. Subsequent iterations will increment Iteration 1026 field as versions 2.1, 2.2 and so on.

Figure 11:
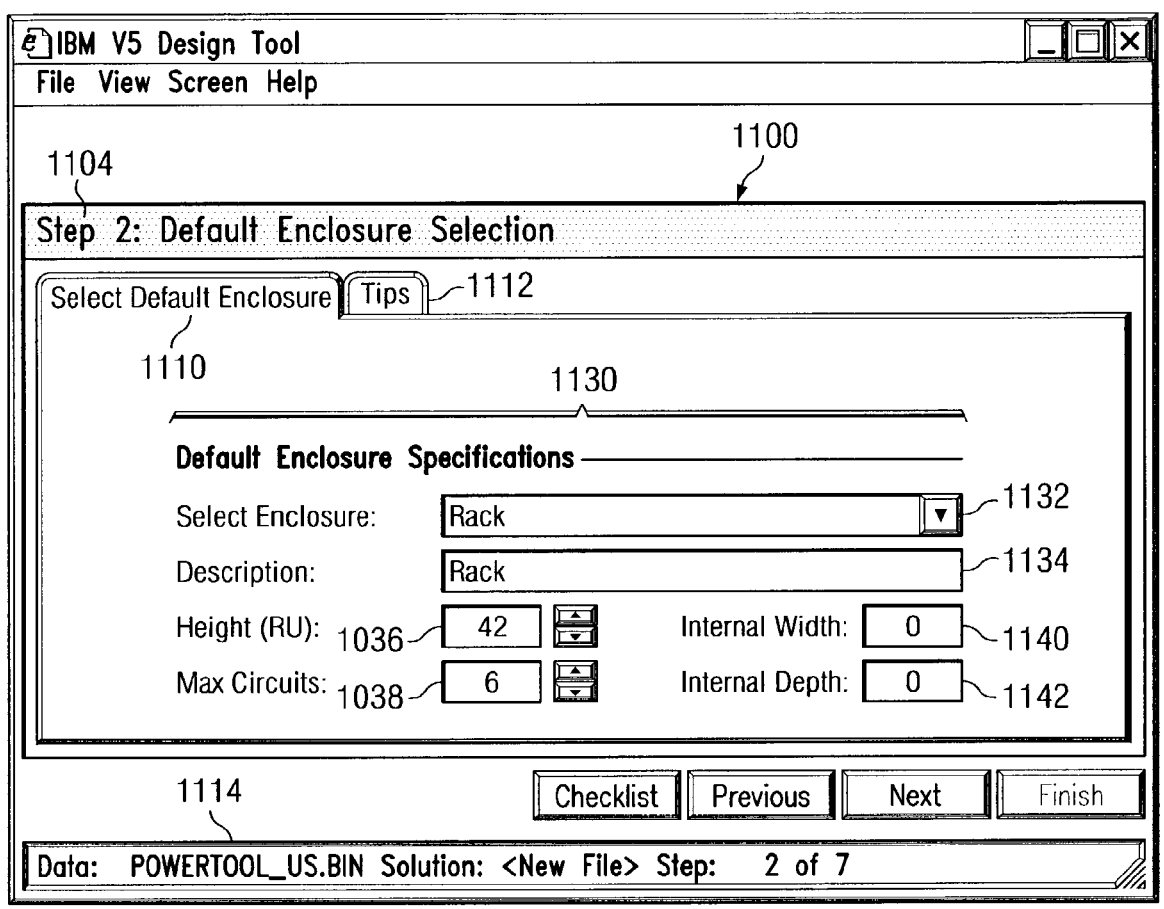
FIG. 11 depicts the Default Enclosure Screen.

FIG. 11 depicts Default Enclosure Screen (DES) 1100. DES 1100 has Select Default Enclosure Tab 1110 and Tips Tab 1112. DES 1100 initially displays Select Default Enclosure Tab 1110 which displays separate windows for entering Default Enclosure Specifications 1130. Default Enclosure Specifications 1130 has windows to enter Select Enclosure 1132, Description 1134, Height (RU) 1036, Max Circuits 1038, Internal Width 1140 and Internal Depth 1142. DES 1100 is needed for creating the enclosure elevations for the network solution diagram. The Power Distribution Tool program automates the creation of the elevations for the enclosures. In order to use the Power Distribution Tool, an export file is created and sent to the Power Distribution Tool during Step 7, the final processing phase. Contained in the export file are all the solution devices plus the default enclosure selection. In the example shown in FIG. 11, a Rack has been selected that is 42 RU in height and with a maximum of six circuits.

Figure 12:
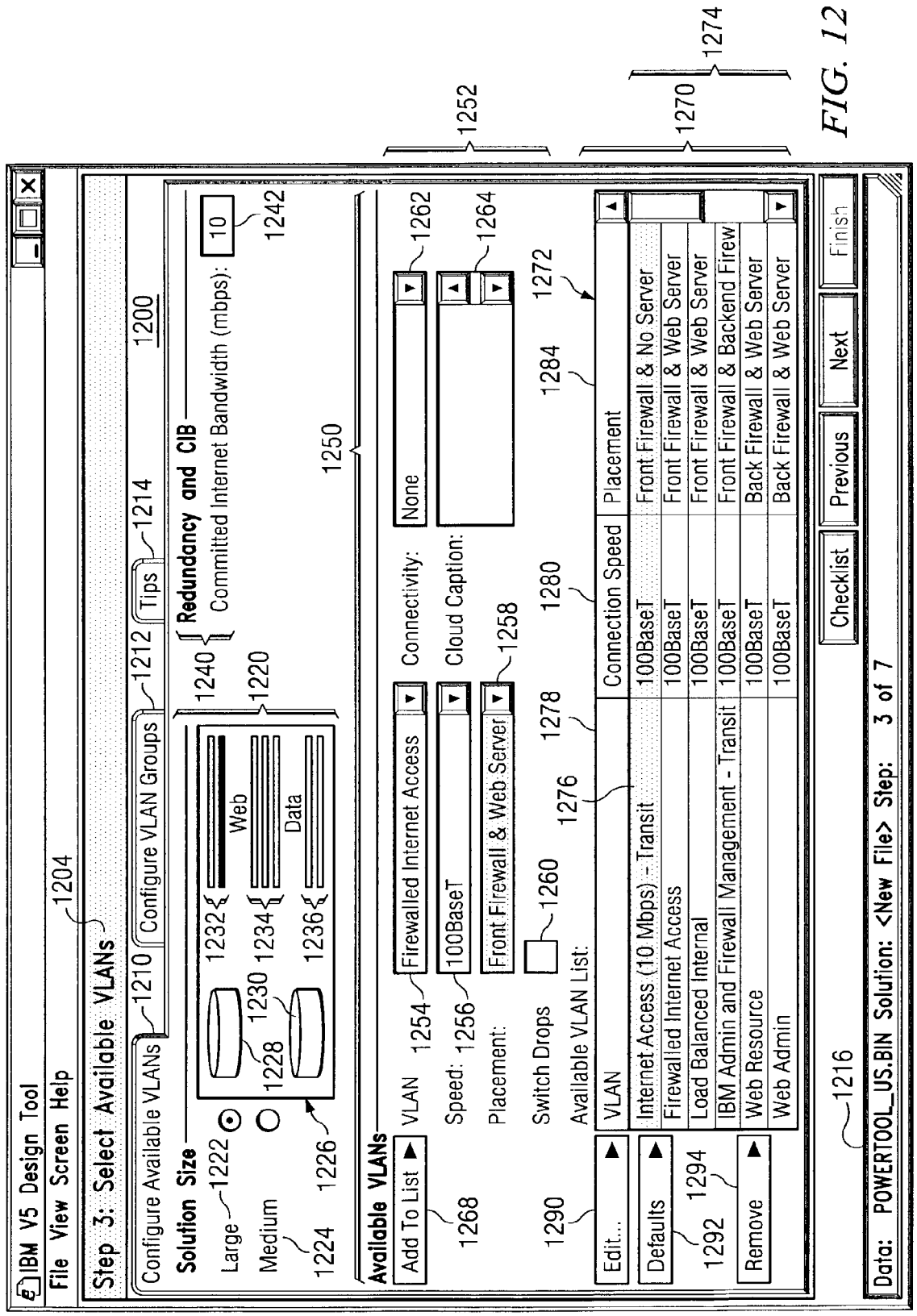
FIG. 12 depicts the Select Available VLANs Screen at the Configure Available VLANs Tab.

FIG. 12 depicts Select Available VLANs Screen (SAVS) 1200 which opens at Configure Available VLANs tab 1210. Select Available VLANs Screen 1200 has three separate areas for input: solution size area 1220, Redundancy and CIB area 1240, and Available VLANs area 1252. Solution size area 1220 has first radio button 1222 labeled Large and second radio button 1224 labeled Medium. Select Available VLANs is Step 3 of the Design Tool process as shown in SAVS title 1204. Step 3 of the Design Tool establishes the network solution's connectivity requirements. SAVS 1200 requires the user to select a solution size. Solution size window 1226 provides a graphical display. The options for solution size are a one-layer medium-sized solution (the default for a new solution) or a two-layer large-size solution. The Design Tool provides a default list of available VLANs. The actual VLANs and groups are dependent upon the selected solution size. When the user changes the solution size, the Design Tool purges all of the currently available VLANs, empties all of the VLAN groups including user-created groups, and creates typical "available" VLAN groups that are missing and appropriate for the size of the solution. The default VLAN groups are populated with typical VLANs. User-defined VLAN groups are not deleted and user-defined VLAN groups are manually repopulated with VLANs. If there are any network-connected devices in the solution at the time the user changes the solution size, those devices retain their VLAN group assignment. If the device's assigned VLAN group was a default group, then the device's network connectivity is automatically re-established. The user must confirm that the typical connectivity that the Design Tool provides for default VLAN groups matches the connectivity requirements of each device.

Redundancy and CIB (RCIB) area 1240 has RCIB window 1240 labeled "Committed Internet Bandwidth (mbps)." The user enters the Committed Internet Bandwidth (CIB) in RCIB window 1240. The value that the user enters is automatically inserted into Internet Access VLAN caption 1276. Available VLANs area 1252 has "add to list" button 1268 with the following windows: VLAN 1254, Speed 1256, Placement 1258, Connectivity 1262 and Cloud Caption 1264. Available VLAN list display 1270 has VLAN column 1278, Connection Speed column 1280 and Placement column 1284. The user may add, edit or remove a VLAN. To add a VLAN the user selects or enters a VLAN caption (for example, VPN Access—Transit) in VLAN 1254, selects the Speed (for example, 100BaseT) in Speed 1256, selects the Placement (for example, Back Firewall & No Server) in Placement 1258, selects the Connectivity (for example, VPN Access) in Connectivity 1262, and edits the Cloud caption (for example, IBM VPN Service Area xxxK Ha+, HA, SA, VPN) in Cloud Caption 1264, and activates SAVS Add to List Button 1268. Placement 1258 selection is key to the location of the VLAN with respect to the firewalls. To Edit a VLAN the user highlights a VLAN in Available VLAN list 1272 and activates SAVS Edit Button 1290. The user may then modify any properties of the VLAN to meet the solution requirements. To Remove a VLAN the user highlights a VLAN in Available VLAN list 1272 and activates SAVS Remove Button 1294.

Solution Size window 1226 provides visual display so that the user can check the placement of the VLAN the user is adding. Solution lines 1232 in show one dark and one light line. In the preferred embodiment, the red and blue lines are used. The red line (or as in Solution lines 1232 the dark line) shows the position of the added VLAN. When the position is correct, the user activates SAVS Add to List Button 1268.

Figure 13:
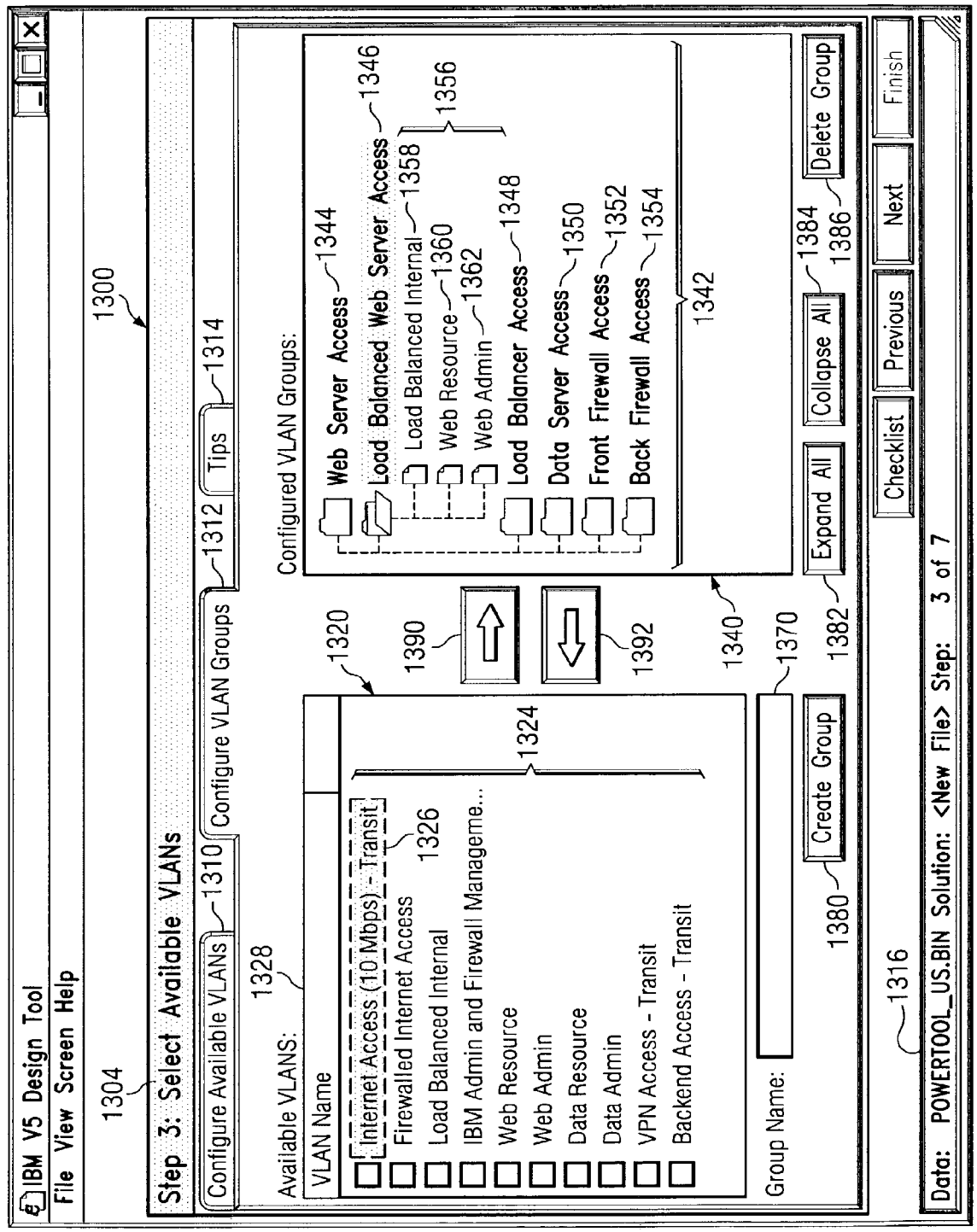
FIG. 13 depicts the Select Available VLANs Screen at the Configure VLAN Groups Tab.

FIG. 13 depicts the Select Accessible VLANs Screen at the Configure VLAN Groups Tab 1312. Configure VLAN Groups Tab 1312 has two areas: Available VLANS window 1328 and Configured VLAN Groups window 1340. Available VLANs window 1320 displays VLAN Names column 1328 and VLAN Names display 1324 showing a list of VLAN names with a checkbox by each name. VLAN Names display 1324 contains all of the VLANs that have been configured for the network solution. Below Available VLANs window 1328 is Group Name window 1370. Below Group Name window 1370 is Create Group Button 1380. Configured VLAN Groups window 1340 displays Configured VLAN Groups File List 1342 by which specific groups can be accessed. VLAN Groups File List 1342 displays all VLAN Groups that have been configured for use in the network solution. In the preferred embodiment, default groups created by the Design Tool appear in blue and user-created VLAN Groups appear in black. Below Configured VLAN Groups window 1340 are Expand All button 1382, Collapse All button 1384 and Delete Group button 1386. Default VLAN Groups and user-added VLAN Groups that have been assigned to devices can not be deleted. Although the use of certain groups are recommended (e.g. firewall groups for firewalls and load balancer groups for load balancers) the user is not required to use all of the VLAN Groups. Unused VLAN Groups do not affect the drawing of the network solution. The user may enter a check in the box next to a selected VLAN in the Available VLAN list 1324 and activate SAVS Right Arrow 1390 to add selected VLANs from the Available VLAN list 1324 into a selected VLAN Group in Configured VLAN Group List 1342. Alternatively to the check box, the user may highlight a selected VLAN. The user may remove selected VLANs from a default Configured VLAN Group or from a user-added VLAN Group by clicking on the file folder or by highlighting the selected group and activating SAVS Left Arrow 1392.

The user may create a VLAN Group by entering the VLAN Group in Group Name window 1370 and then activating SAVS Create Group Button 1380. The user then selects each of the VLANs in Available VLAN List 1324 to be placed into the new VLAN Group. Next, the user selects the Group Name in the Configured VLAN Groups List 1342 by clicking on the file folder, or by highlighting the file folder, and then activating the SAVS Right Button 1390. These actions move the selected VLANs into the selected VLAN Group, adding entries in Configured VLAN Group List 1342 below the name of the selected VLAN Group. To delete a VLAN Group, the user first selects a VLAN Group from the Configured VLAN Group list 1342 and then either activates SAVS Left Button 1392 or activates SAVS Delete Group Button 1386.

To expand a single VLAN Group, the user may select the group with a pointing device. In order to view the contents of all groups, the user activates Expand All button 1382. Activating the Collapse All button 1384 hides the VLAN members of each group and therefore, only the VLAN Group names will be displayed.

Figure 14:
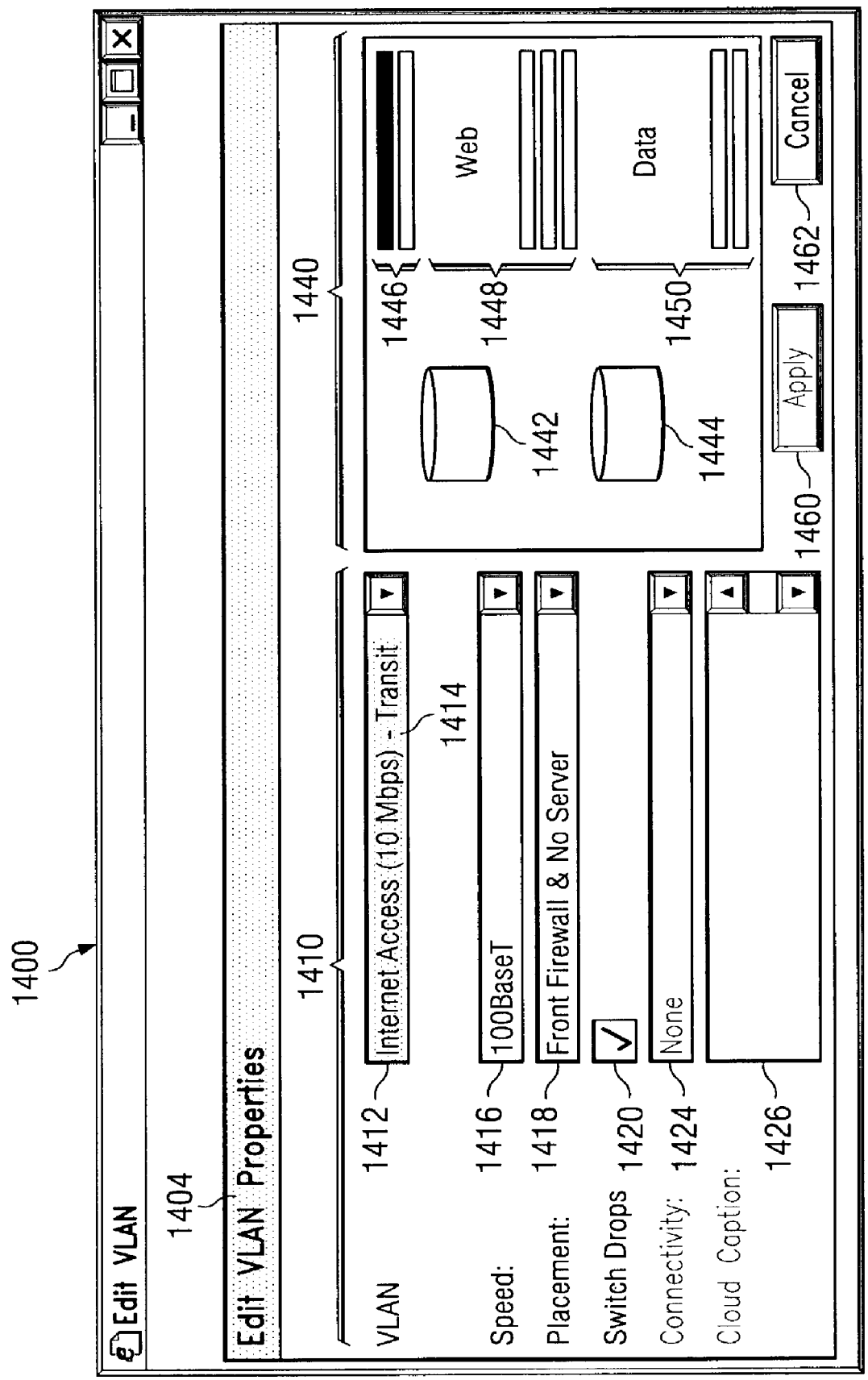
FIG. 14 depicts the Edit VLAN Properties Screen.

FIG. 14 depicts Edit VLAN Properties Screen 1400 having title 1404, Data area 1410 and Display area 1440. Data area 1410 has the following windows for data entry: VLAN 1412, Speed 1416, Placement 1418, Connectivity 1424 and Cloud Caption 1426. In addition the Data area 1410 has Switch Drops check box 1420. Display area 1440 functions in the same way as Solution Size window 1220 (see FIG. 12). Beneath display area 1440 are Apply button 1460 and Cancel button 1462. Edit VLAN Properties Screen 1400 is displayed when the user double-clicks a VLAN in the Available VLANs List 1270 (see FIG. 12) or when the user selects an entry in Available VLANs List 1270 and activates SAVS Edit Button 1290 (see FIG. 12).

Figure 15:
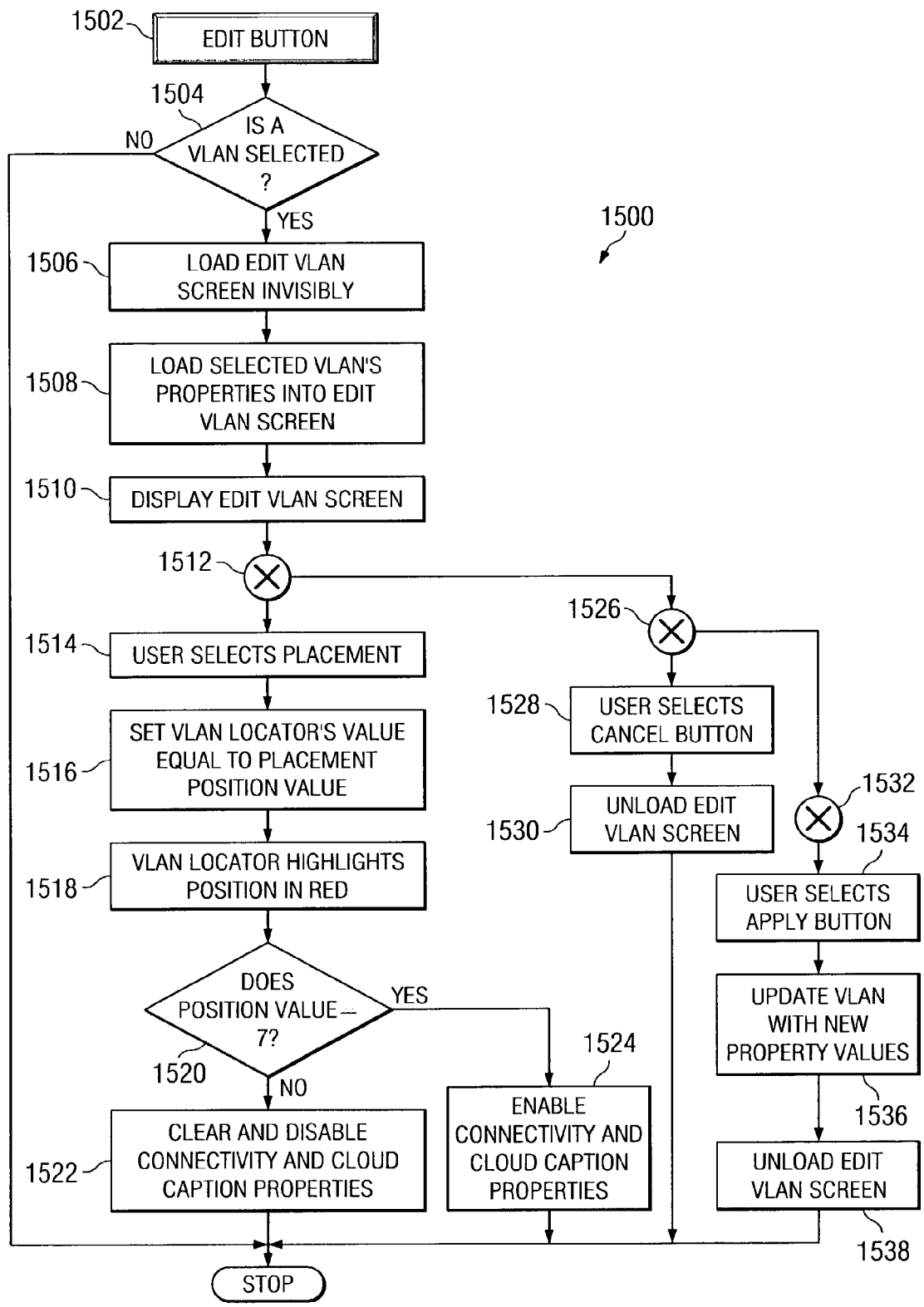
FIG. 15 depicts a flow chart of the Edit Properties process.

FIG. 15 depicts a flow chart of Edit Button (EB) process 1500. The edit button (see FIG. 12, Edit Button 1290) is activated (1502) and a determination is made as to whether a VLAN has been selected (1504). If not, EB 1500 stops. If a VLAN has been selected, EB 1500 loads the Edit VLAN screen invisibly (1506), loads the selected VLAN's properties into the EDIT VLAN screen (1508) and displays the EDIT VLAN screen (1510). If the user selects Placement (1514), EB 1500 sets VLAN locator's value equal to the placement position value (1516) and highlights the VLAN locator position in red (1518). A determination is made whether the position value is equal to 7 (1520). If the position value is equal to 7, then EB 1500 enables connectivity and cloud caption properties (1524) and EB 1500 stops. If the position value in not equal to 7, then EB 1500 clears and disables the connectivity and cloud caption properties (1522) and EB 1500 stops.

The user selects network devices in Step 4. The devices used in the network solution are divided into two groups: Primary and Related devices. Examples of primary devices include without limitation switches, firewalls, servers, load balancers, patch panels, KVM switches, and intrusion detection devices. Primary devices are independent devices that can provide stand alone functionality in the solution. A primary device may have related (dependent) devices assigned to it in order to enhance its functionality, but primary devices do not always require related devices.

Related devices are further divided into two categories: Shared and Non-shared. Shared devices are devices that are shared between two servers that act as a cluster. Non-shared devices are those additional devices that supplement the functionality of a single server or other primary device. Related devices include without limitation expansion storage devices and devices that generally do not operate as independent devices. Related devices do not have network connectivity like a web, application or database server.

The available primary devices and available related devices reside in a database accessed by the Design Tool. The database also contains available rack, cabinet, or enclosure selections and electrical power circuit selections for use by the Power Distribution Tool. When used in a stand alone computer, the database may reside in the same memory as the Design Tool. Alternatively, the data base may reside in a remote computer or server computer connected by a network to a local computer containing the Design Tool.

Figure 16:
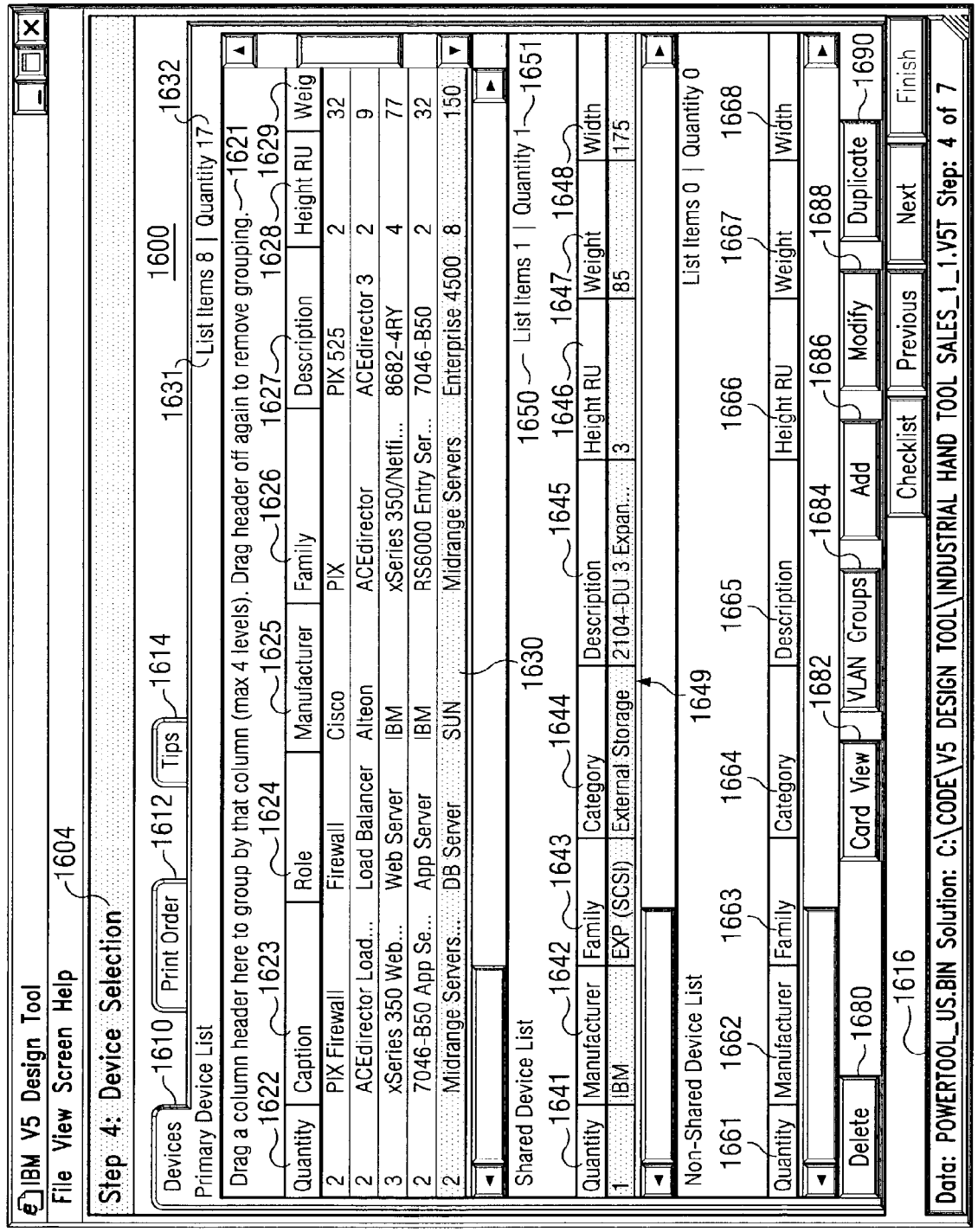
FIG. 16 depicts the Device Selection Screen at the Devices Tab.

FIG. 16 depicts Device Selection Screen (DSS) 1600 at Devices Tab 1610. Devices Tab 1610 has Primary Device List 1620, Shared Device List 1640 and Non-Shared Device List 1660. Primary Device List 1620 has column headers Quantity 1622, Caption 1623, Role 1624, Manufacturer 1625, Family 1626, Description 1627, Height RU 1628, Weight 1629 and Width (not shown). Shared Device List 1640 has column headers Quantity 1641, Manufacturer 1642, Family 1643, Category 1644, Description 1645, Height RU 1646, Weight 1647 and Width 1648. Non Shared Device List 1660 has column headers Quantity 1661, Manufacturer 1662, Family 1663, Category 1664, Description 1665, Height RU 1666, Weight 1667 and Width 1668. DSS 1600 further has Devices Tab 1610, Card View Button 1682, VLAN Groups Button 1684, Add Button 1686, Modify Button 1688 and Duplicate Button 1690.

To add a device to the network solution, the user activates Add Button 1686. Activation of Add Button 1686 will cause Add New Devices Screen 1900 to appear (see FIG. 19 for a discussion of Add New Devices Screen 1900). As will be explained in greater detail below, using Add New Devices Screen 1900, the user first selects a primary device, enters a desired quantity and other properties, and configures a number of related shared or non-shared devices. The user then edits the primary device's configuration text, adds an optional device note and adds the primary device (plus the devices related to the primary device if there are any) to the network solution. As each new primary device is added, a new entry will appear in Primary Device list 1620 representing the new primary device. Shared Device List 1640 and Non-Shared Device List 1660 will have new entries added only if the newly added primary device has any related devices configured.

Devices Tab 1610 has the following features. The window for Shared Device List 1640 and the window for Non-Shared Device List 1660 can be increased or decreased in size by placing a pointing device on the boundary between the lists and dragging the boundary. In addition, the user may place a pointing device over any of the column headers in the window for Primary Device List 1620 and drag the respective column header into the area immediately above the column headers. Primary Device List Note 1621 reminds the user of this feature and indicates that up to four column headers may be dragged and placed into hierarchy of four levels. The hierarchical order in which the dragged column headers are placed will cause the information displayed in Primary Device List 1620 to be rearranged in the order of the dragged column headers.

Figure 17:
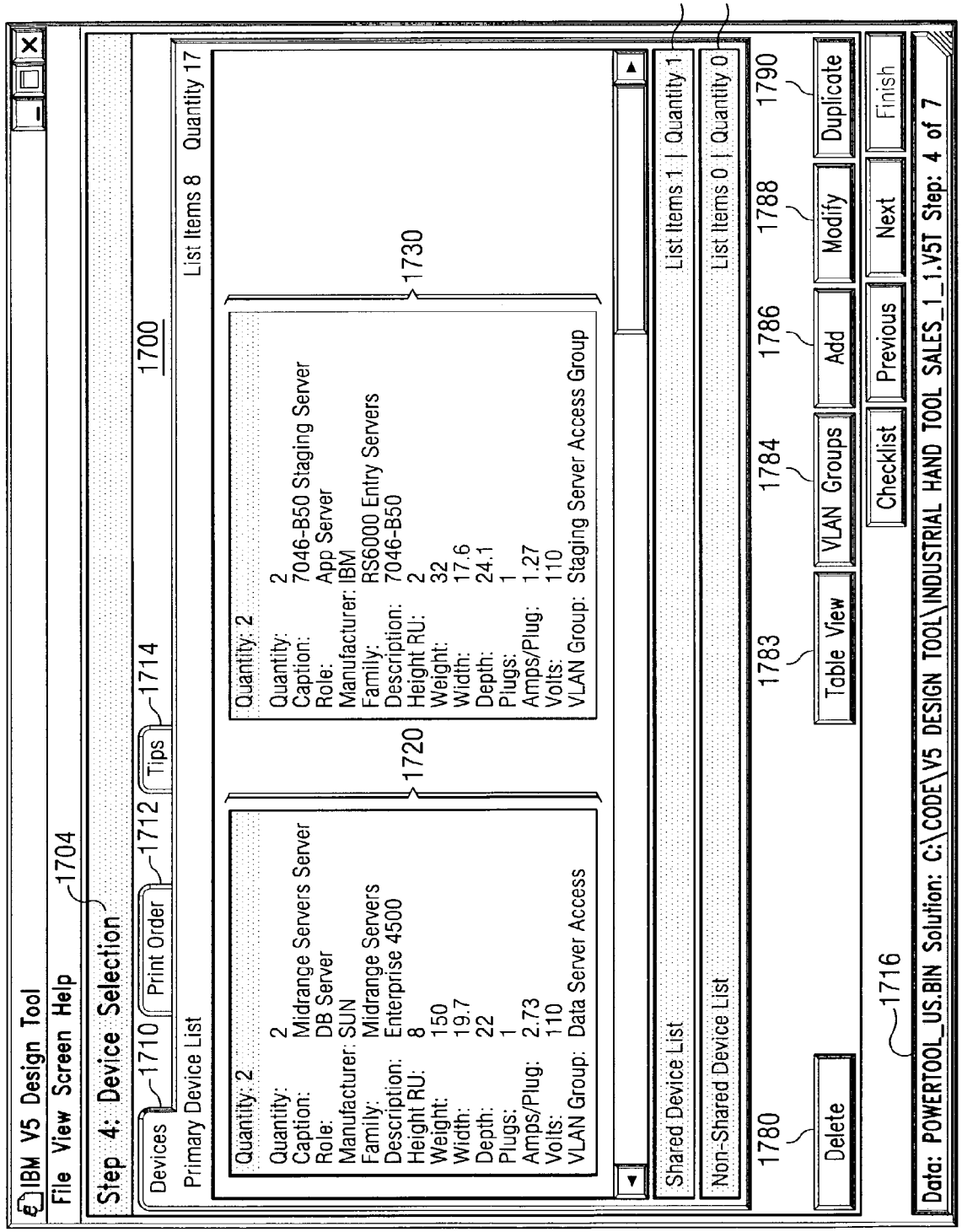
FIG. 17 depicts the Device Selection Screen at the Devices Tab showing devices in Card View.

FIG. 17 depicts Devices Tab 1610 at Card View display 1730. Devices Tab 1620 has first card view area 1720 and second card view area 1730. Devices Tab 1620 has Delete Button 1780, Table View Button 1783, VLAN Groups Button 1784, Add button 1786, Modify button 1788 and Duplicate Button 1790. With the exception of Table View Button 1783, each of the buttons corresponds to its counterpart at Devices Tab 1610 (see FIG. 16). Table View Button 1783 toggles between Card View Button 1682 and itself as either is activated.

Figure 18:
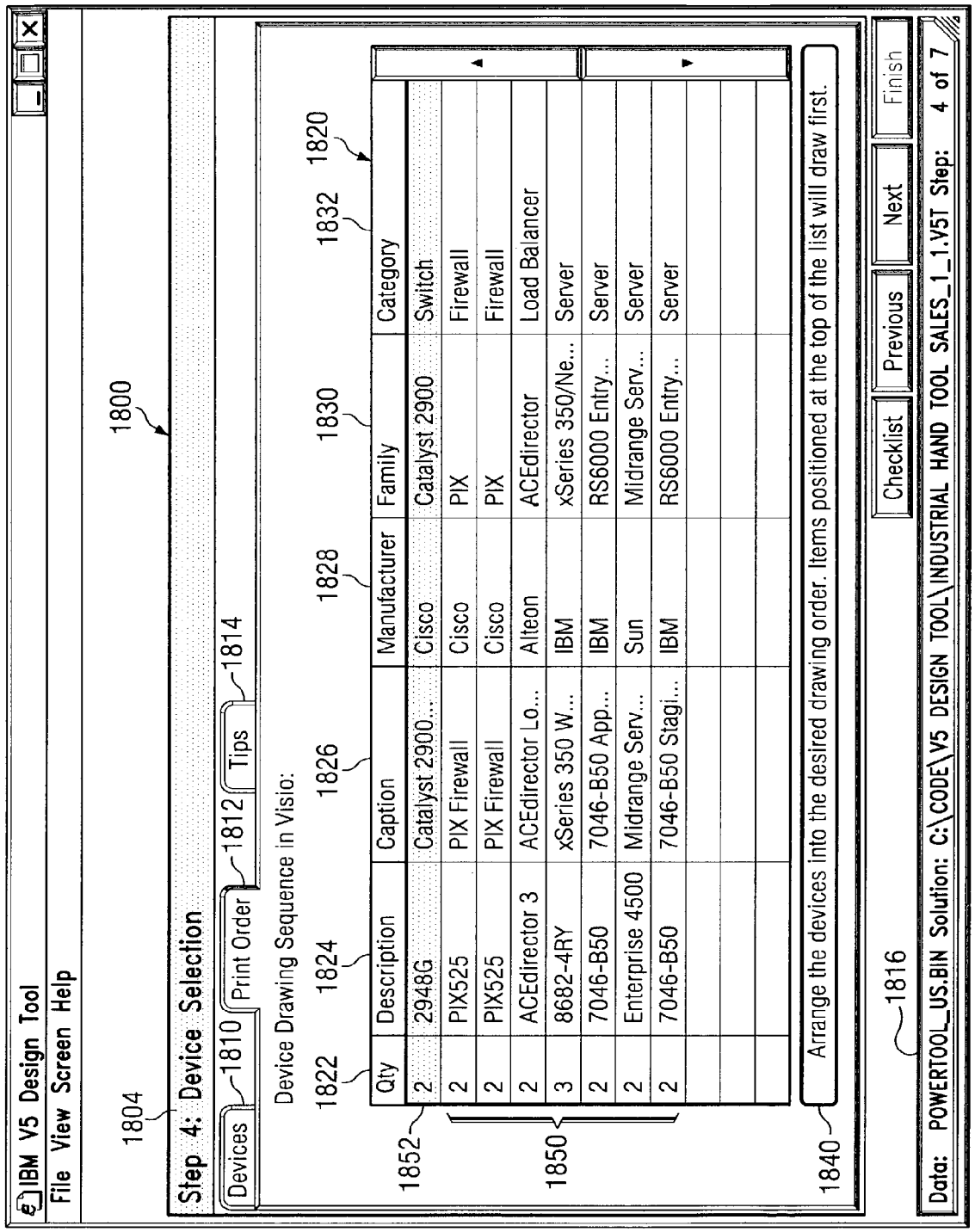
FIG. 18 depicts the Device Selection Screen at the Print Order Tab

FIG. 18 depicts Device Selection Screen 1600 at Print Order Tab 1812. Print Order Tab 1812 has Print Order List Display 1820 and Message Display 1840. Print Order List Display 1820 has Quantity (Qty) Column 1822, Description Column 1824, Caption Column 1826, Manufacturer Column 1828, Family Column 1830 and Category Column 1820.

FIG. 19 depicts Add New Devices Screen 1900 at Configure Primary Device Tab 1910. Add New Devices Screen 1900 has five tabbed screens where the user may configure a primary device, configure related devices, edit a configuration file, enter device notes, or access tips information. Configure Primary Devices tab 1910 has two information areas: Selected Devices Area 1924 and Available Devices area 1920. Available Devices Area 1920 contains a list of devices populated from the current data file. Selected Devices Area 1924 is where the user confirms or edits each of the properties associated with the selected device. Configure Primary Devices Tab 1910 has Retrieve Item button 1950, Category Filter window 1952 and Search Criteria window 1954. Add New Devices Screen has Close Button 1960, Add Button 1962, Apply Button 1964 and Reset Button 1966.

The user may use Category Filter window 1952 to display a select group of these items such as servers, firewalls or load balancers. The user may use the Search Criteria by entering key works or data into Search Criteria window 1954. Once the desired device is found, the user may place the desired device into the property fields. The user may place the desired device into the property fields in two ways. First, the user may double click on the device. Second, the user may highlight the device and activate Retrieve Item button 1950. Once either of the above actions are taken, the device properties will populate the Selected Device Display 1924 which can be scrolled in order to view all of the properties. In an alternative embodiment, an alternate Add New Devices screen has buttons for each of the property fields that will cause the device's properties for the selected property field to appear in an area to the right of the buttons.

In either embodiment, an Available Device List displays devices from the current data file. In FIG. 19, by way of example, there are 490 available devices (see display 1942) that can be scrolled in alphabetical order. The user has highlighted Entry Tower Server 1940 and the property edit fields in the Selected Devices area 1924 are populated with the selected device's properties. The properties are grouped into the following categories: Priority, General, Electrical, Physical, MSA, ADSM, and Interconnect.

Priority Information includes Caption, Role, VLAN Group, Operating System, KVM Ports, Quantity and Cluster Software. The Caption is the text displayed on the device when the device is drawn in a Visio® diagram. The Role property indicates how the device will be used in the solution and is used by the Design Tool to determine what other selections are available for the device (such as whether or not related devices are supported). If the user selects an appropriate role for the selected primary device, Configure Related Devices Tab 2012 becomes enabled (see FIG. 20). Server, firewall, switch and load balancing devices are not available at the Configure Related Devices Tab, but only devices that typically act in a supporting role like expansion storage devices and shelves (shelves always participate in a supporting role). The VLAN Group property setting determines the network connectivity of the selected device. The VLAN Group property is available for web, application server firewall, database server firewall, load balancer and intrusion detection device roles. The Operating System property selection indicates the operating system the device will use and is used by the Design Tool to determine whether redundant connectivity is supported when configuring clusters. The Operating System property selection is available for web, application and database server, firewall, load balancer and intrusion detection device roles. The number of KVM Ports property specifies the number of KVM ports required by the device. The Quantity property value indicates the number of devices to include in the network solution. If the selected device is a cluster, the Quantity property value indicates the number of clustered server-pairs. The Cluster Software property indicates that the device is a cluster for any selection other than "None." The Cluster Software property is available for web, application and database server roles. Clustered servers may have typically required hardware drawn even though the user has not specifically added the hardware to the solution.

Next the user edits General Specs. Under General Specs, the user may edit the Manufacturer, Family, Category, and Description properties. The Manufacturer property stores the name of the device's manufacturing company. The Family property indicates the selected device's product line (for example, Catalyst 2900 Series). The Category property indicates the general description of the device like firewall, switch, server, or other typical description. The Description property is the text that will be displayed for the device in the rack elevation created with the help of the Power Distribution Tool.

The Electrical Specs property fields for a device include Plug Type, Plugs, Voltage, and Amps/Plug properties. The Plug Type property allows the user to enter a description of the devices electrical plug. The Plugs property records the number of plugs that a device requires and is significant when placing the device into a rack or enclosure. The Voltage property records the operating voltage required by the device and is significant when the time arrives to place the device into a rack or enclosure. The Amps/Plug property indicates current load on each plug and is significant when placing the device into a rack or enclosure. The Amps/Plug property will be the value deducted from the available current provided by each circuit to which the device is later connected.

The Physical Specification properties include all dimensional properties and the device weight. The Height (RU) property represents the device's height in rack units (RU). One rack unit is equivalent to 1.75 U.S. inches and the Height (RU) value is used to determine if the device will fit in a rack or the remaining space of an enclosure.

The MSA Specs property is available for devices having web, application or database server roles. The user indicates the number of connections and the type of connectivity. Connectivity may only be defined if the number of connections is greater than zero 0. When MSA is configured, this primary device will appear on the Visio® drawing's physical pages connected to a MSA cloud with the specified number of network connections.

The ADSM Specs property section is available for devices having web, application or database server roles. The user indicates the number of connections and the type of connectivity. Connectivity may only be defined if the number of connections is greater than 0. When ADSM is configured, this primary device will appear on the Visio drawing's physical pages connected to a ADSM cloud with the specified number of network connections.

The Interconnect Specs property fields are disabled for all but devices having switch, load balancer or firewall roles. For the switch device role, the interconnects represent trunklines, while for the load balancer or firewall roles they represent heartbeat connections or connections to synchronize state tables. To add an interconnect (see FIG. 22) enter a Caption (not available for devices designated with the switch role), select a connection Method and then select Add. The user may add one, two or more interconnects. To edit or remove an interconnect, the user first selects the interconnect entry in the list and then selects Remove. The selected item will be removed from the list and its properties will be placed into the edit fields. Then the user makes the necessary changes and adds the interconnect back into the list.

The user may select additional devices for certain primary devices that permit the addition of related devices. This process is similar to that of adding primary devices except that the user may configure multiple related devices, creating a list of those items in the bottom most region of the screen. The most common related devices are expansion disks and associated hardware.

Figure 20:
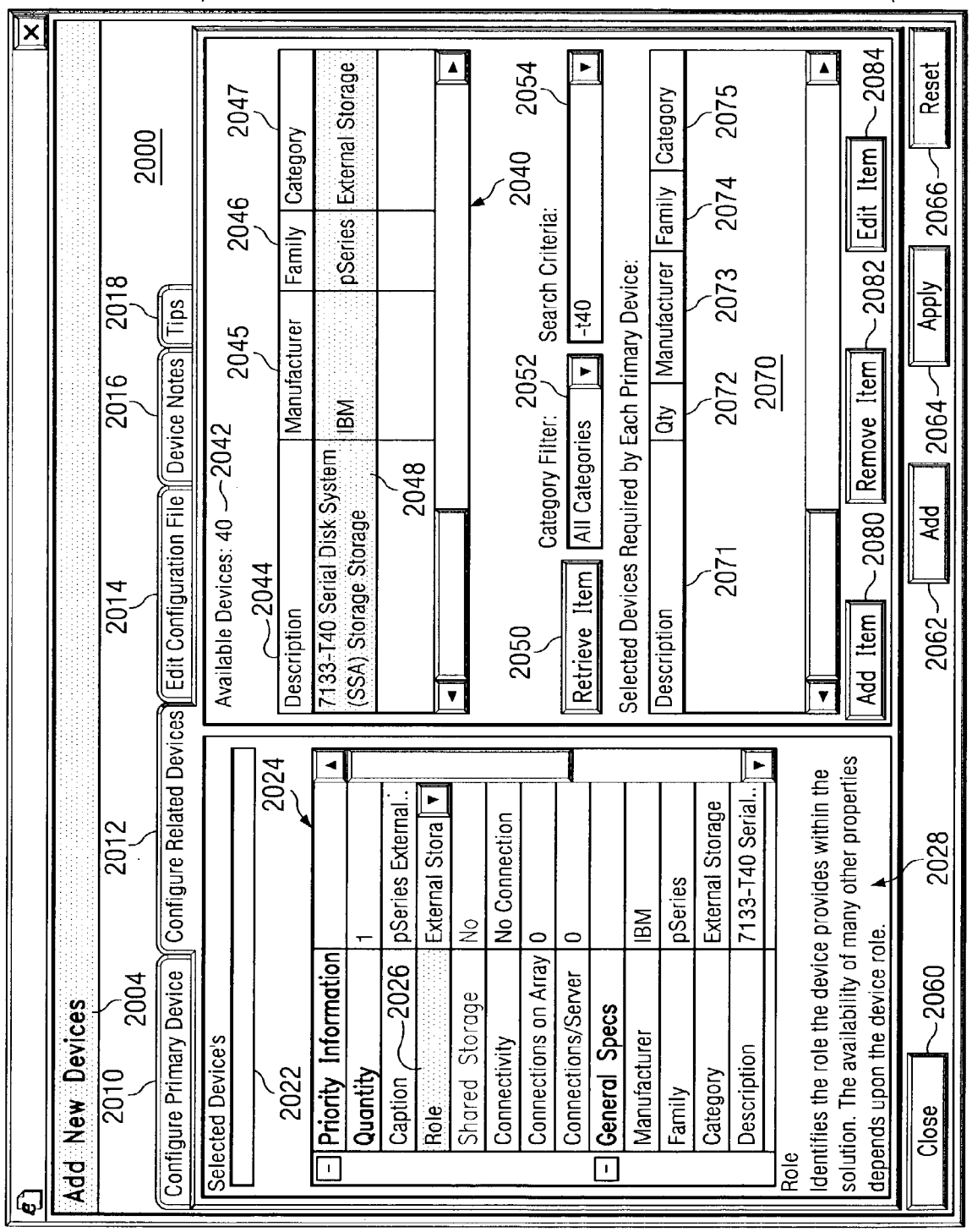
FIG. 20 depicts the Add New Devices Screen at the Configure Related Devices Tab

FIG. 20 depicts Add New Devices Screen 1900 at Configure Related Devices Tab 2012. Configure Related Devices Tab 2012 has Display Area 2020 having a Selected Devices window 2022, Priority Information Display 2024, Information Display 2028, Available Devices Count 2042, Available Devices Display 2048, Retrieve Item Button 2050, Category Filter 2052, Search Criteria Window 2054, Selected Devices Required by Each Primary Device Window 2070, Add Item Button 2080, Remove Item Button 2082 and Edit Item Button 2084. In addition, Configure Related Devices Tab 2012 has Close Button 2060, Add Button 2062, Apply Button 2064 and Reset Button 2066. Available Devices Display 2048 has Description Column 2044, Manufacturer Column 2045, Family Column 2046, and Category Column 2047. Selected Devices Required by Each Primary Device Display has Description Column 2071, Quantity Column 2072, Manufacturer Column 2073, Family Column 2074 and Category Column 2075.

Figure 21:
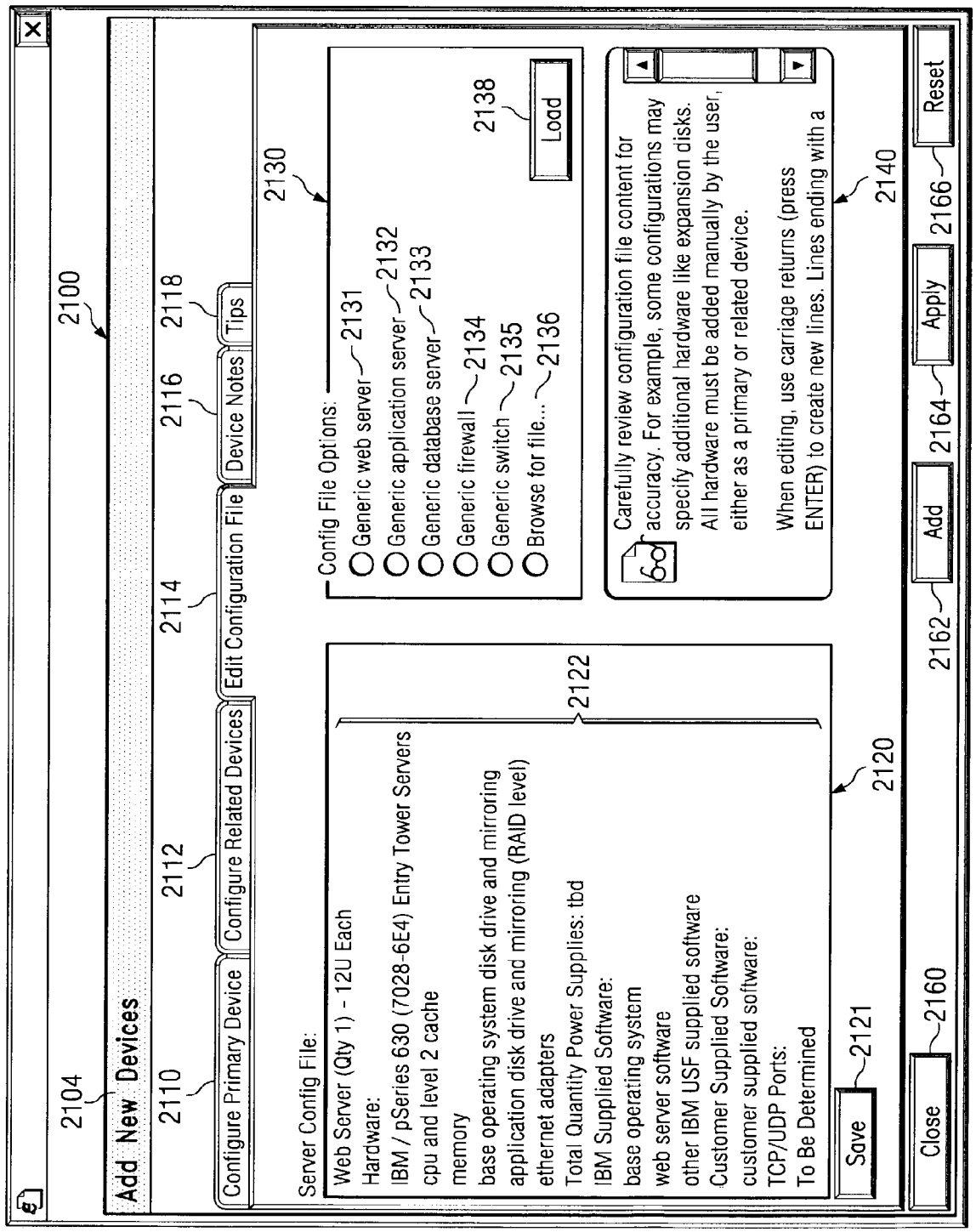
FIG. 21 depicts the Add New Devices Screen at the Edit Configuration File Tab.

FIG. 21 depicts Add New Devices Screen 2104 at Edit Configuration File Tab 2114. Edit Configuration File Tab 2114 has Server Configuration File Display 2120, Configuration File Options Display 2130 and Information Display 2140. In addition, Edit Configuration File Tab 2114 has Save Button 2121, Close Button 2160, Add Button 2162, Apply Button 2164 and Reset Button 2166. At Edit Configuration File Tab 2114, the user may view and edit the device configuration for a selected primary device. If the primary device is rate carded item, the user may obtain a proper rate card configuration file and load it into the editor. Alternatively, the user may edit the generic information provided by the Design Tool or create a configuration using a configurator application and transferring the results into the editor.

Figure 22:
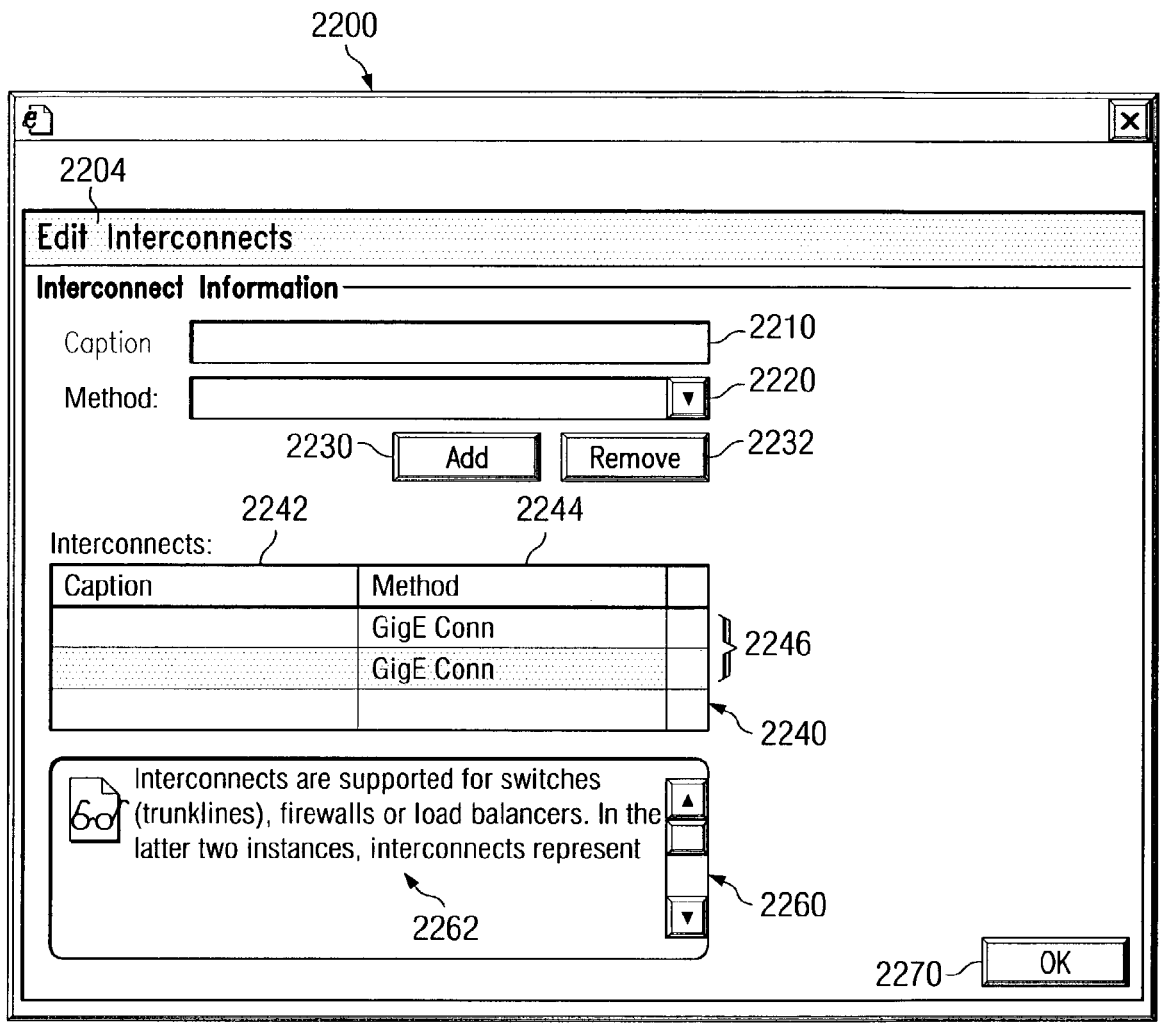
FIG. 22 depicts the Edit Interconnects Screen

FIG. 22 depicts Edit Interconnects Screen 2200. Edit Interconnects Screen 2200 has Title 2204, Caption window 2210, Method Window 2220, Add Button 2230, Remove Button 2232, Interconnects Display 2240, Information Display 2260 and OK Button 2270. Interconnects Display 2240 has Caption Column 2242 and Method Column 2244.

Figure 23:
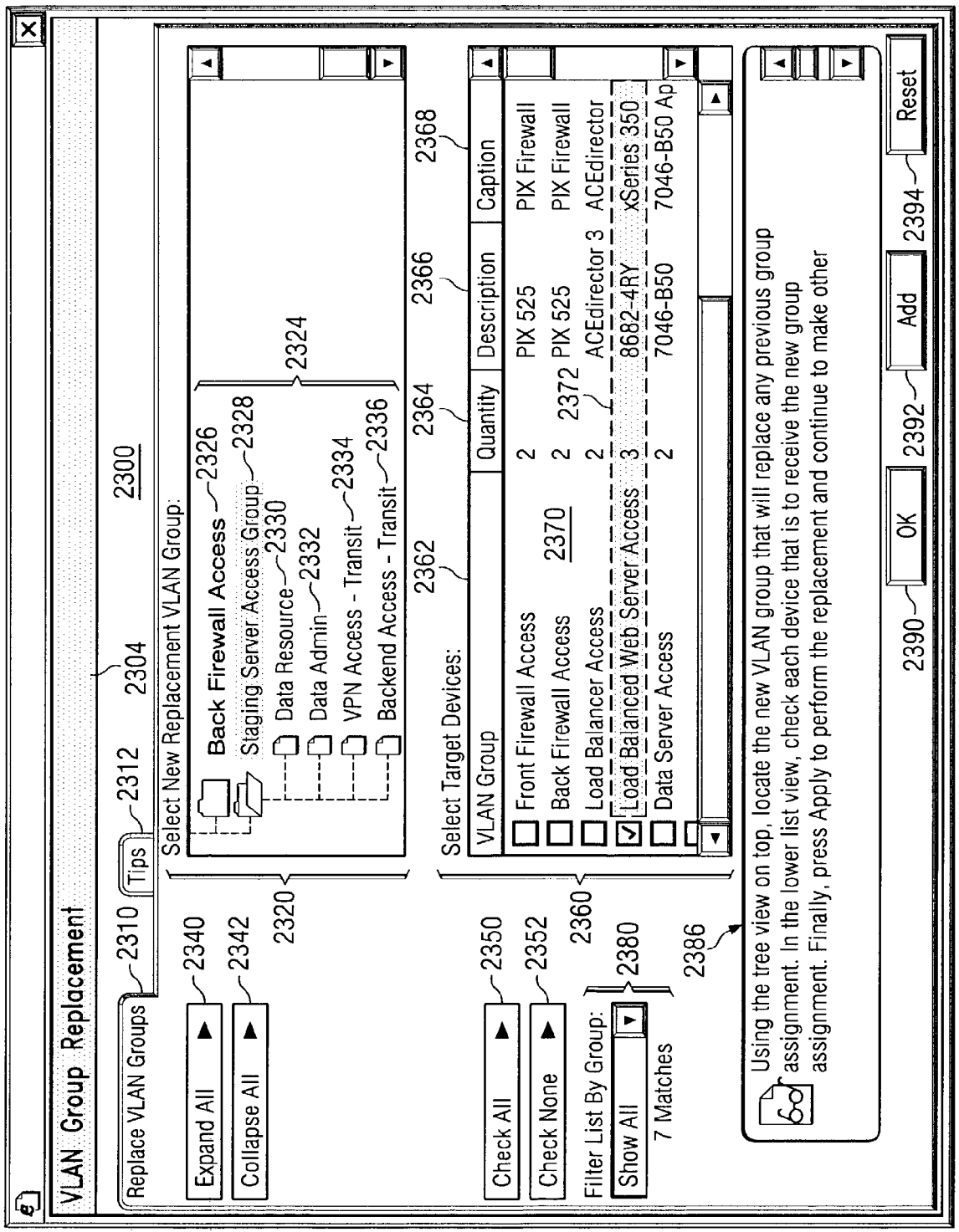
FIG. 23 depicts the VLAN Group Replacement Screen.

FIG. 23 depicts VLAN Group Replacement Screen 2300 at Replace VLAN Groups Tab 2310. Replace VLAN Groups Tab 2310 has Expand All Button 2340, Collapse All Button 2342, Check All Button 2350, Check None Button 2352, Filter List by Group Window 2380, Select New Replacement VLAN Group Display 2320, Select Target Devices Display 2360, Information Display 2386, OK Button 2390, Add Button 2392, and Reset Button 2394.

Figure 24:
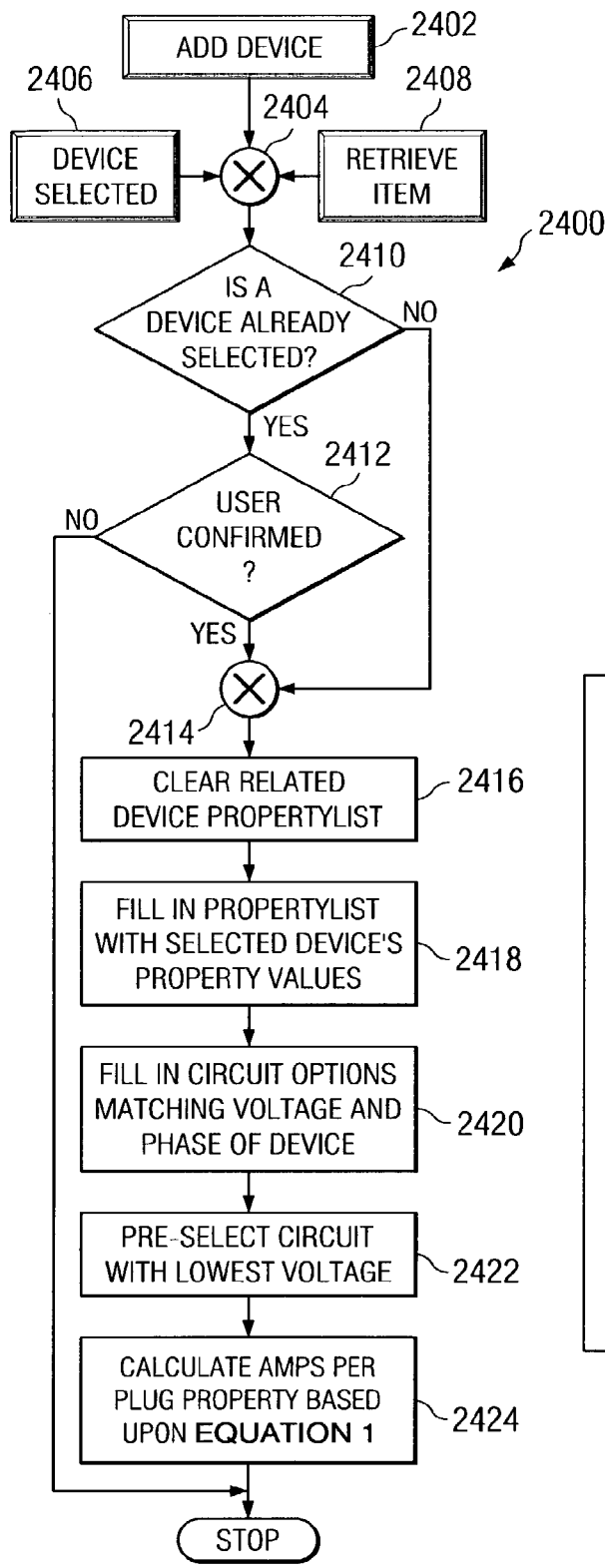
FIG. 24 depicts a flow for the Add Device, Device Selected and Retrieve Item buttons on the Add New Devices Screen.

FIG. 24 depicts the Flow Chart for the Add Device/Device Selected/Retrieve Item (ASR) Process 2400 when either Add Device 2402, Device Selected 2406 or Retrieve Item 2408 are selected. A determination is made whether a device is already selected (2410). If not ASR 2400 goes to step 2416. If a device has already been selected, a determination is made whether a user has been confirmed (2412). If not, ASR 2400 stops. If a user has been confirmed, ASR 2400 clears the related device propertylist (2416), fills in propertylist with the property values of the device that has been selected, added or retrieved (2418), fills in the circuit options, matching voltage and phase of the device that has been selected, added or retrieved (2420), pre-selects the circuit with the lowest voltage (2422) and calculates the amps per plug property based upon the following equation (referred to as Equation 1 in FIG. 24): AmpsPerPlug=WattsPerPowerSupply×PowerSupplies/ (Voltage×PhaseFactor×Power Factor×PlugQuantity) (2424). ASR 2400 then stops.

Figure 25:
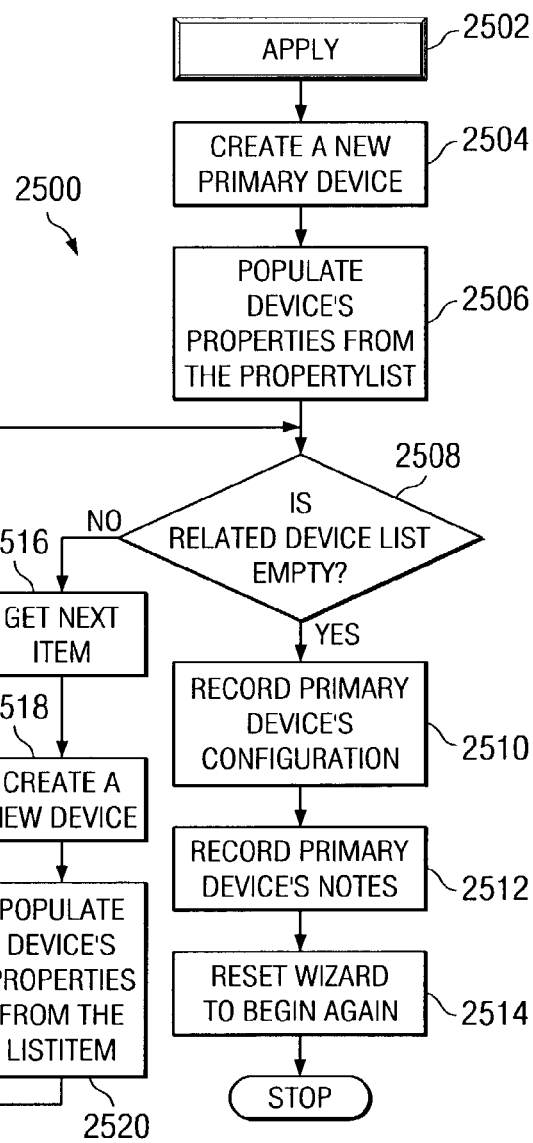
FIG. 25 depicts the Flow Chart for the Apply Button on the Add New Devices Screen

FIG. 25 depicts the Flow Chart for Apply Button Process (ABP) 2500 that takes place when the Apply Buttons 2064 or 2164 on Add New Devices Screen are activated. ABP 2500 begins when the user activates the apply button (2502) and creates a new primary device (2504). Next, ABP 2500 populates the device's properties from the propertylist (2506). A determination is made as to whether the related device list is empty (2508). If not, ABP 2500 gets the next item (2516), creates a new device (2518), populates the device's properties from the listitem (2520) and goes to step 2508. If the related device list is empty, ABP 2500 records the primary device's configuration (2510), records the primary device's notes (2512), resets the Add New Devices Screen and related processes to begin again (2514) and stops.

Figure 26:
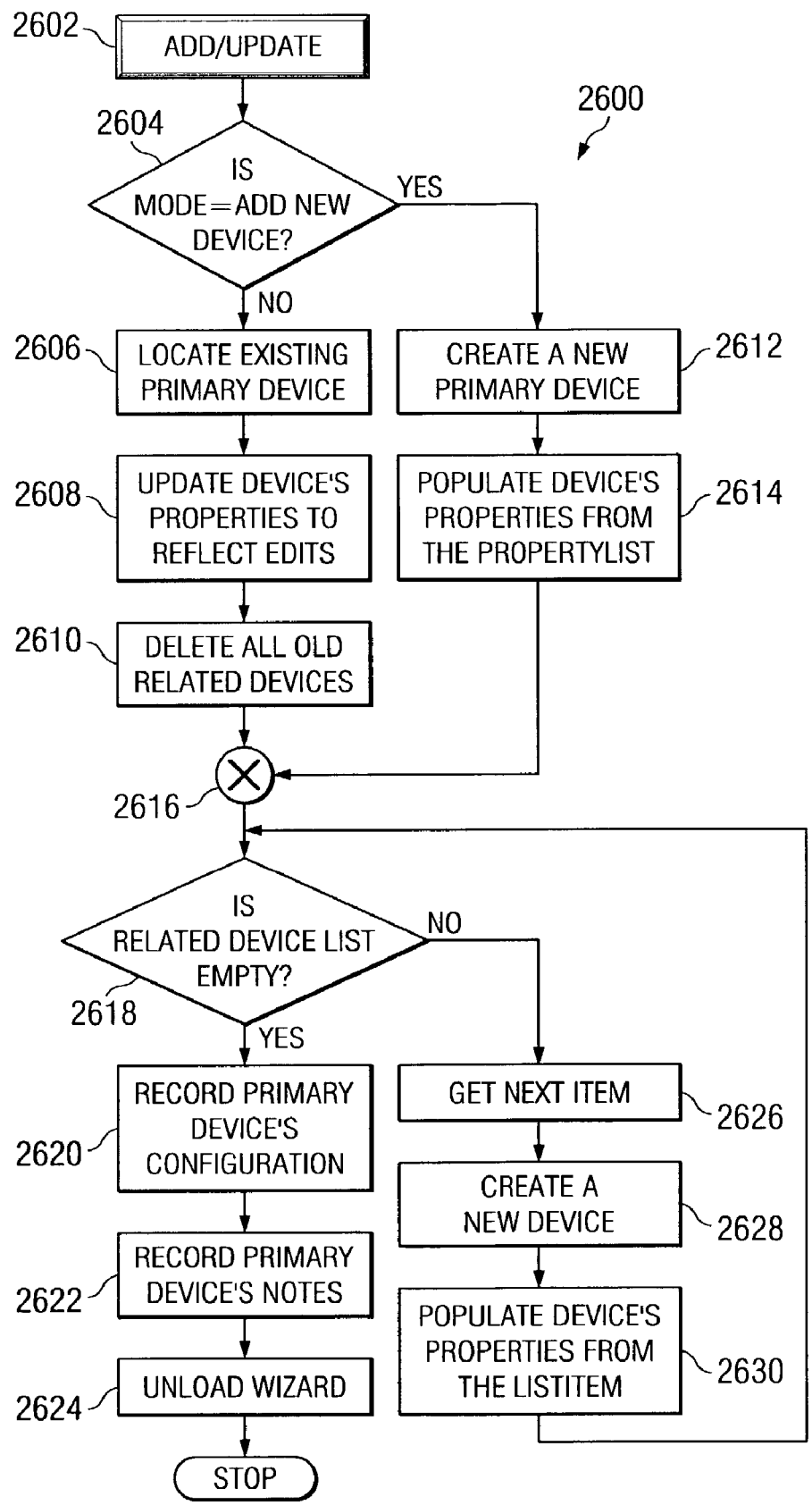
FIG. 26 depicts the Flow Chart for the Add/Update Button on the Add New Devices Screen.

FIG. 26 depicts the Flow Chart for Add Process (ADP) 2600 that takes place when the Add Button on the Add New Devices Screen is activated. ADP 2600 begins when the user activates the Add button (2602) and a determination is made whether Mode=Add New Device. If not, ADP 2600 locates the existing primary device (2606), updates the devices properties to reflect the edits (2608), deletes all old related devices (2610) and goes to step 2618. If a determination is made that Mode equals Add New Device, then ADP 2600 creates a new primary device (2612), populates the devices properties from the property list (2614) and goes to step 2618. A determination is made whether the related device list is empty (2618). If not, ADP 2600 gets the next item (2626), creates a new device (2628), populates the device's properties from the listitem (2630) and returns to step 2618. If the related device list is empty, ADP 2600 records the primary device's configuration (2620), records the primary device's notes (2622), unloads the Add New Devices Screen and related processes (2624) and stops.

Figure 27:
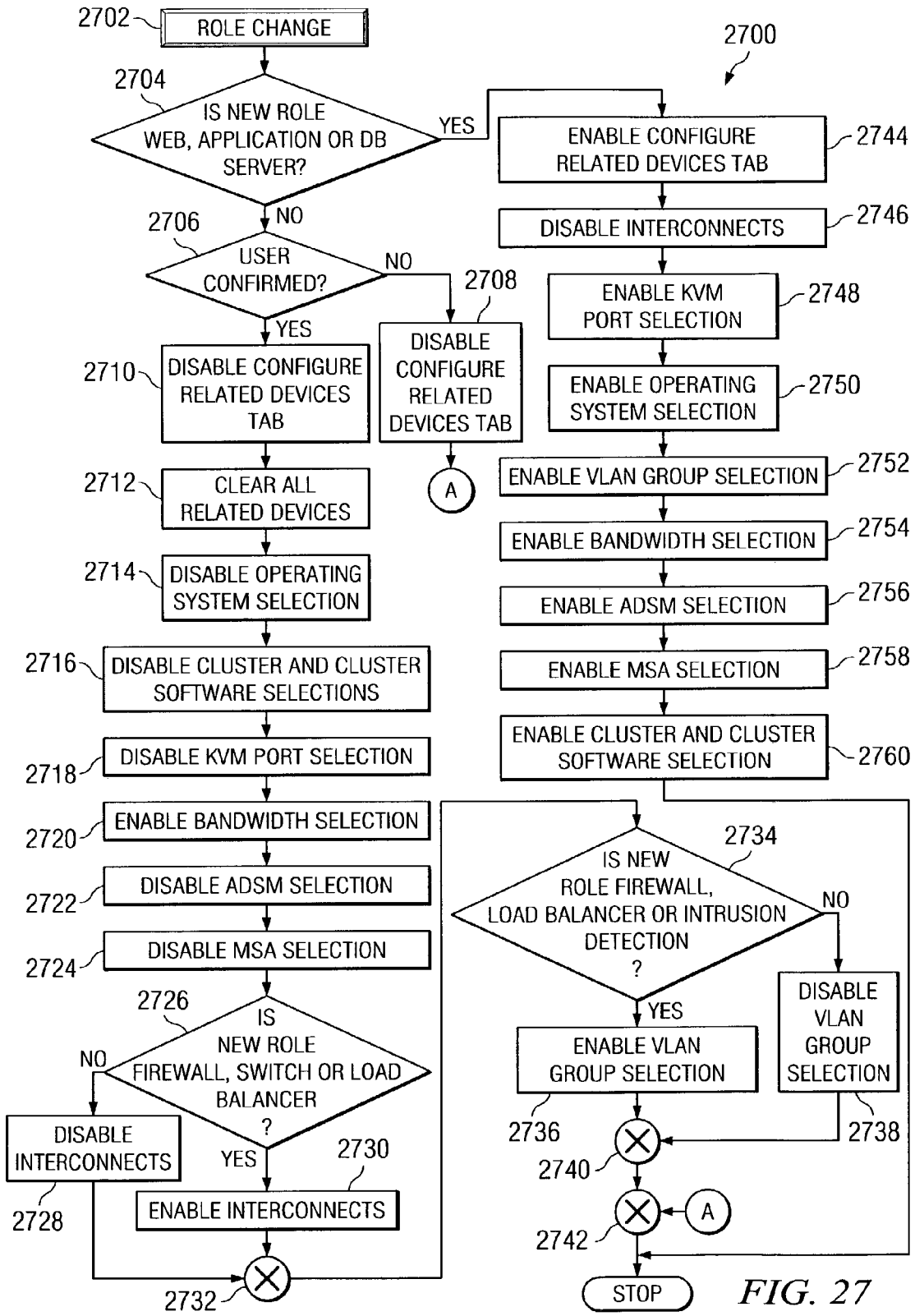
FIG. 27 depicts the Flow Chart for the Role Change Button on the Add New Devices Screen.

FIG. 27 depicts the Flow Chart for Role Change Process (RCP) 2700 that takes place when Role change is entered. RCP 2700 begins when the user enters a Role change (2702) and a determination is made whether new Role is Web, Application or Data Base (DB) Server (2704). If the new Role is Web, Application or Data Base Server, RCP 2700 enables the configure related devices tab (2744), disables interconnects (2746), enables KVM port selection (2748), enables operating system selection (2750), enables VLAN Group Selection (2752), enables Bandwidth Selection (2754), enables ADSM Selection (2756), enables MSA Selection (2758), enables cluster and cluster software selection (2760) and stops. If at step 2704, a determination is made that the new role is not web, application or data base server, a determination is made as to whether the user confirmed (2706). If the user has not confirmed, RCP 2700 disables the Configure Related Devices Tab 2012 (see FIG. 20) (2708) and stops. If at step 2706, the user has confirmed, RCP 2700 disables the Configure Related Devices Tab 2012 (see FIG. 20) (2710), clears all related devices (2713), disables the operating system selection (2714), disables cluster and cluster software selection (2716), disables KVM port selection, enables bandwidth selection (2720), disables ADSM selection (2722) and disables MSA selection (2724). Next, a determination is made whether the new Role is Firewall, Load Balancer or Intrusion Detection (2726). If not, RCP 2700 disables interconnects (2728) and goes to step 2734. If the new role is firewall, switch or load balancer, RCP 2700 enables interconnects (2730) and goes to step 2734. Next, a determination is made as to whether the new role is firewall, load balancer, or intrusion detection (2734). If not, RCP 2700 disables VLAN Group Selection (2738) and stops. If the new role is firewall, load balancer, or intrusion detection, RCP 2700 enables VLAN Group Selection (2736) and stops.

Figure 28:
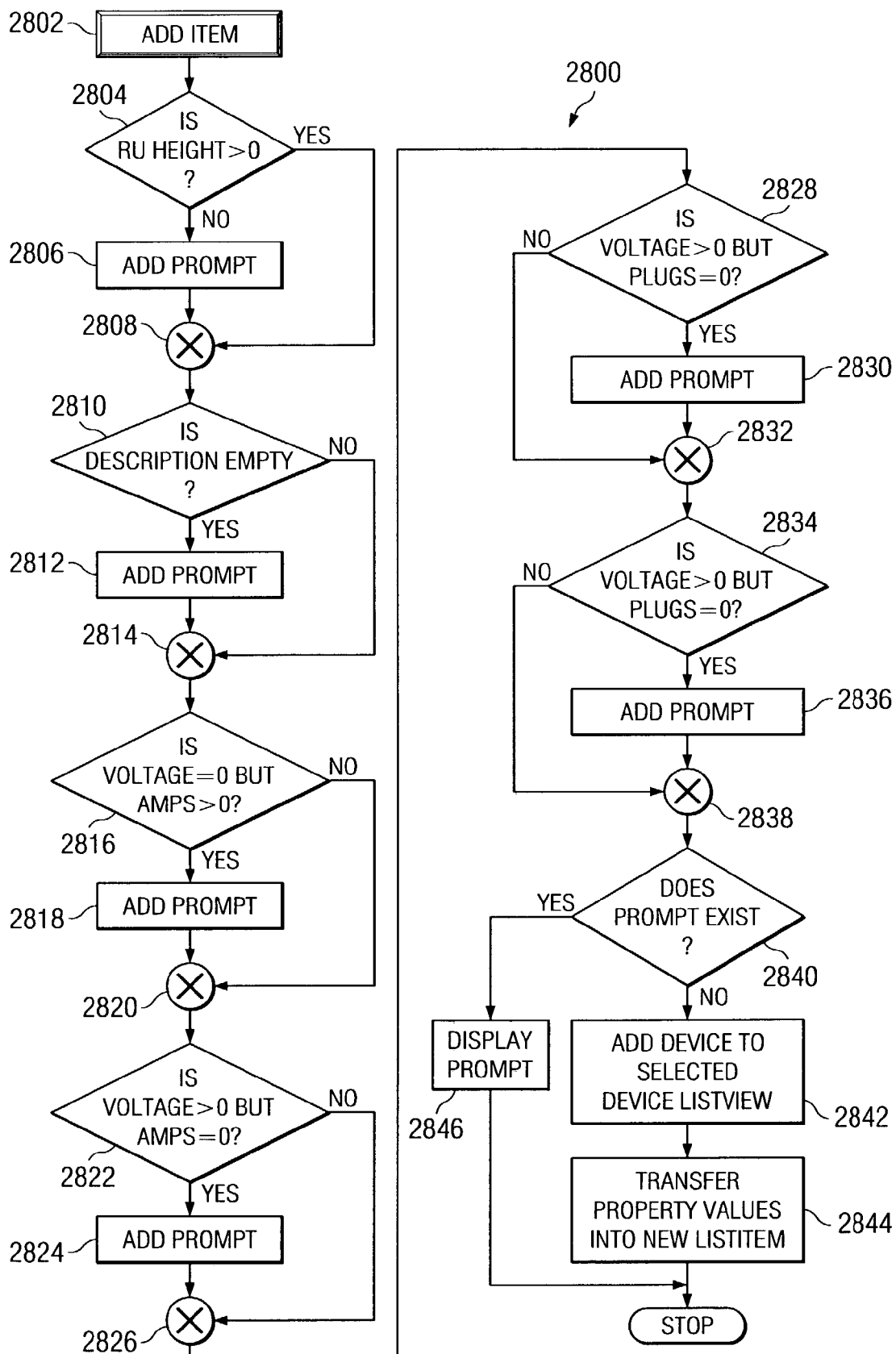
FIG. 28 depicts the Flow Chart for the Add Item button.

FIG. 28 depicts the Flow Chart for Add Item Process (AIP) 2800 that takes place when the Add Item Button is activated. The user activates the Add Item Button (2802) and a determination is made as to whether the Rack Unit (RU) height is greater than 0. If not, a prompt is added (2806). If the RU height is greater than zero a determination is made whether the description is empty (2810). If the description is empty, a prompt is added (2812). If not, a determination is made whether Voltage equals 0 but Amps are greater than 0. If so, a prompt is added (2818). If not, a determination is made whether the voltage is greater than 0 but the amps equal 0. If so, a prompt is added (2824). If not, a determination is made whether Voltage is greater than 0 but the number of plugs equals 0 (2828). If so, a prompt is added (2830). If not, a determination is made whether Voltage is greater than 0 but the number of plugs equals 0. If so, a prompt is added (2836). If not, a determination is made whether one or more prompts exist (2840). If so, the prompts are displayed (2846) and AIP 2800 stops. If not, the device is added to the selected device listview (2842) and the property values for the device are transferred into the new listitem.

Figure 29:
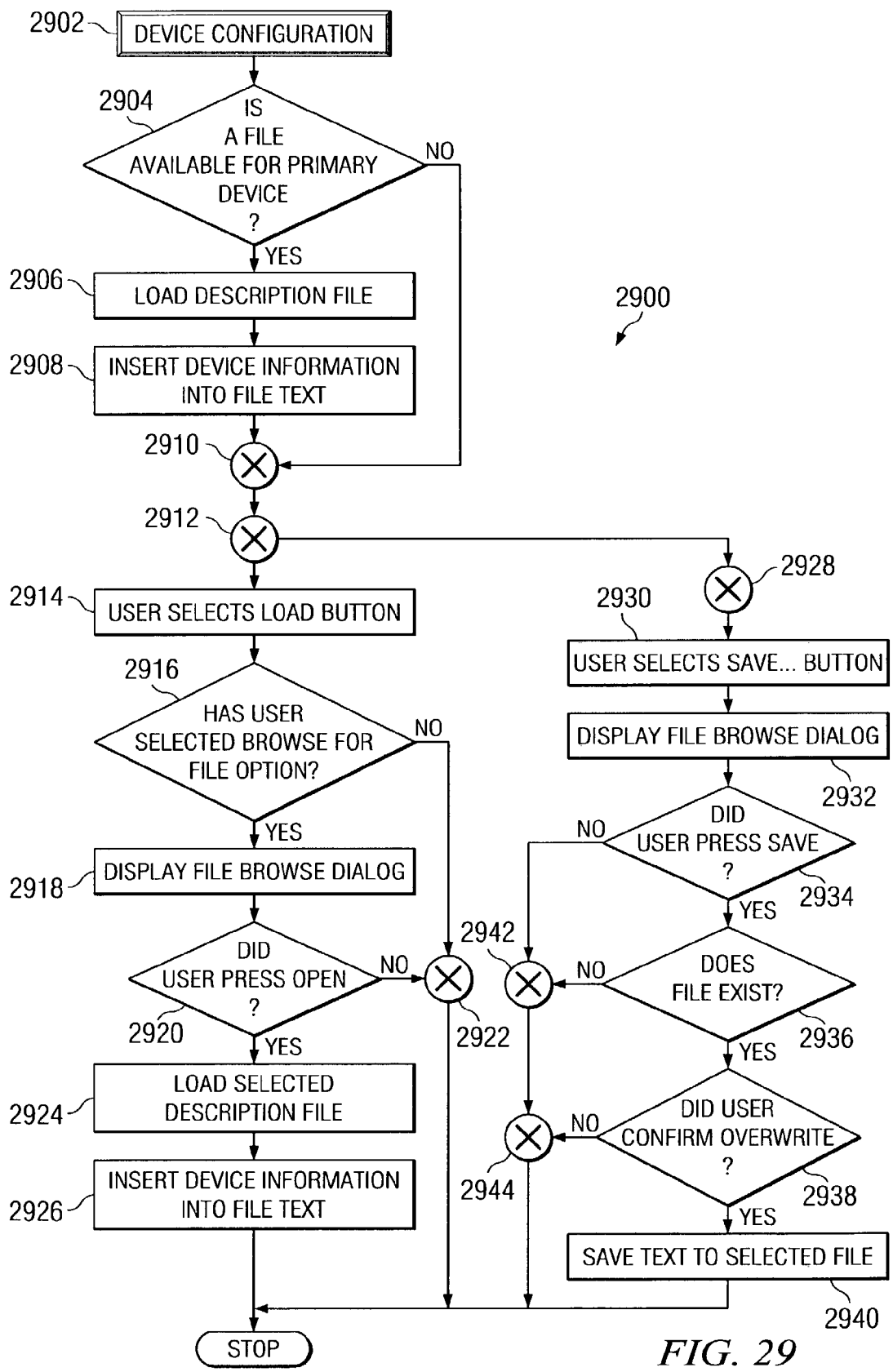
FIG. 29 depicts the Flow Chart for the Device Configuration Button

FIG. 29 depicts the Flow Chart for the Device Configuration Process (DCP) 2900 that takes place when the Device Configuration Button is activated. DCP 2900 begins when the user selects the Device Configuration Button (2902) and a determination is made whether a file is available for Primary Device (2904). If so, the primary device description file is loaded (2906) and the primary device information is inserted into the file text (2908). If a file is not available for the primary device, DCP 2900 goes to step 2912. A determination is made whether the user has selected the load button or the save button (2912). If the user selects the load button, a determination is made whether the user has selected the browse for file option (2916). If not, DCP 2900 stops. If so, DCP 2900 displays the file browse dialog (2918). A determination is made whether the user pressed open (2920). If not, DCP 2900 stops. If so, DCP 2900 loads the selected description file (2924), inserts the device information into the file text (2926) and stops. If at step 2914 the user selected the save button, DCP 2900 displays the file browse dialog (2932) and a determination is made whether the user selected save (2934). If not, DCP 2900 stops. If so, DCP 2900 determines whether a file exits (2936). If not, DCP 2900 stops. If a file exits, DCP 2900 determines whether the user confirmed overwrite (2938). If not, DCP 2900 stops. If the user confirmed overwrite, the text is saved to the selected file (2940) and DCP 2900 stops.

Figure 30:
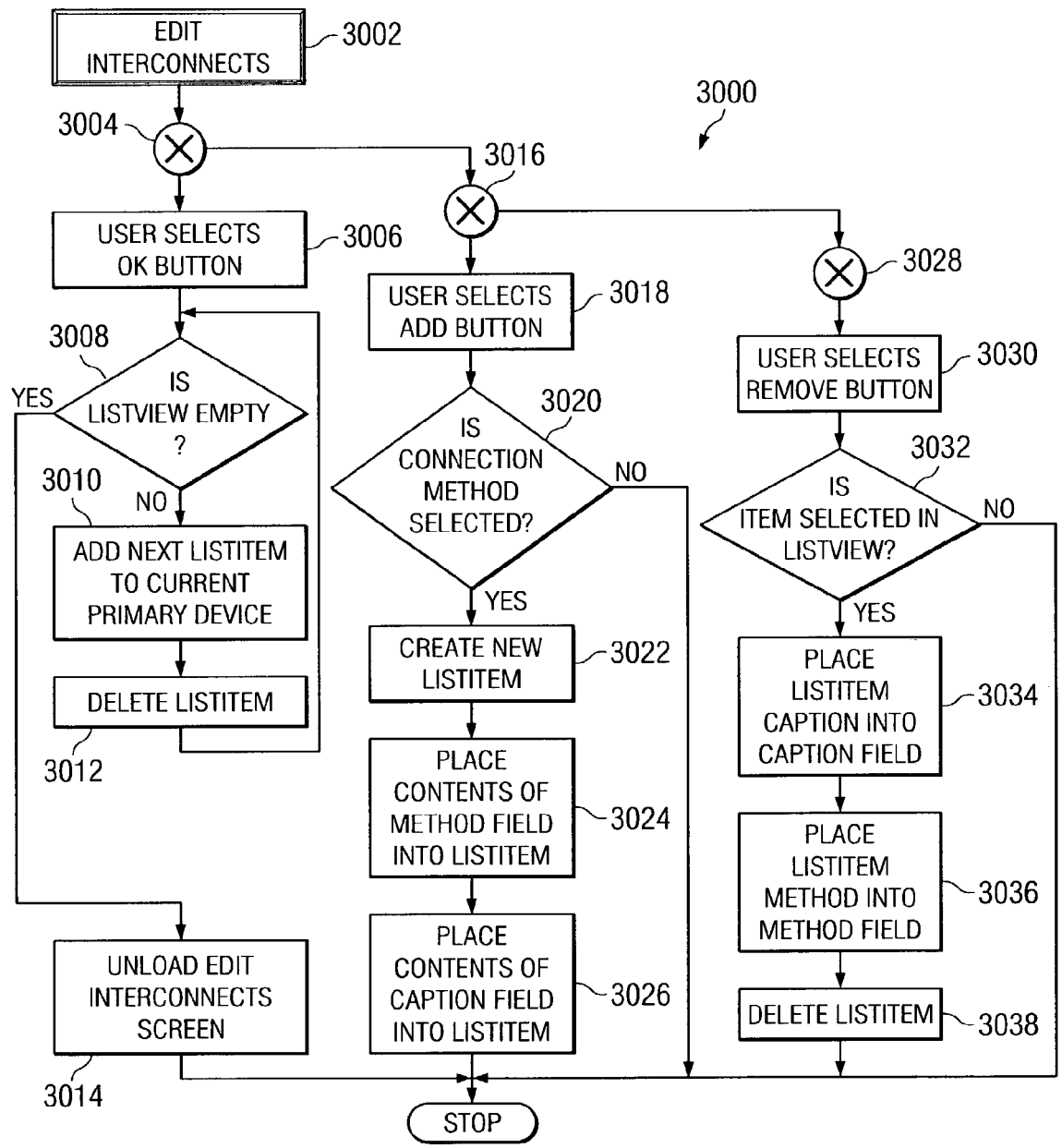
FIG. 30 depicts the Flow Chart for the Edit Interconnects Button.

FIG. 30 depicts the Flow Chart for Edit Interconnects Process (EIP) 3000 that takes place when the user activates one of three buttons on the Edit Interconnects Screen. The user has three choices on Edit Interconnects Screen 2200 (see FIG. 22). The user may select OK Button 2270, Add Button 2230 or Remove Button 2232 on Edit Interconnects Screen 2200. If the user selects OK button 2270 (3006), a determination is made as to whether listview is empty (3008). If so, EIP 3000 unloads the edit interconnects screen (3014) and stops. If not, EIP 3000 adds the next listitem to the current Primary Device (3010), deletes the listitem (3012) and returns to step 3008.

If at junction 3004 the user selects Add button 2230 (3018), a determination is made whether a connection method has been selected (3020). If not, EIP 3000 stops. If so, a new listitem is created (3022), the contents of the method field are placed into listitem (3024), the contents of the caption field are placed into listitem (3026) and EIP 3000 stops.

If at junction 3004 the user selects Remove Button 2232 (3030), a determination is made whether the item selected is in listview (3032). If not, EIP 3000 stops. If so, the listitem caption is placed into the caption field. (3034), the listitem method is placed into the method field, the listitem is deleted (3038) and EIP 3000 stops.

Figure 31:
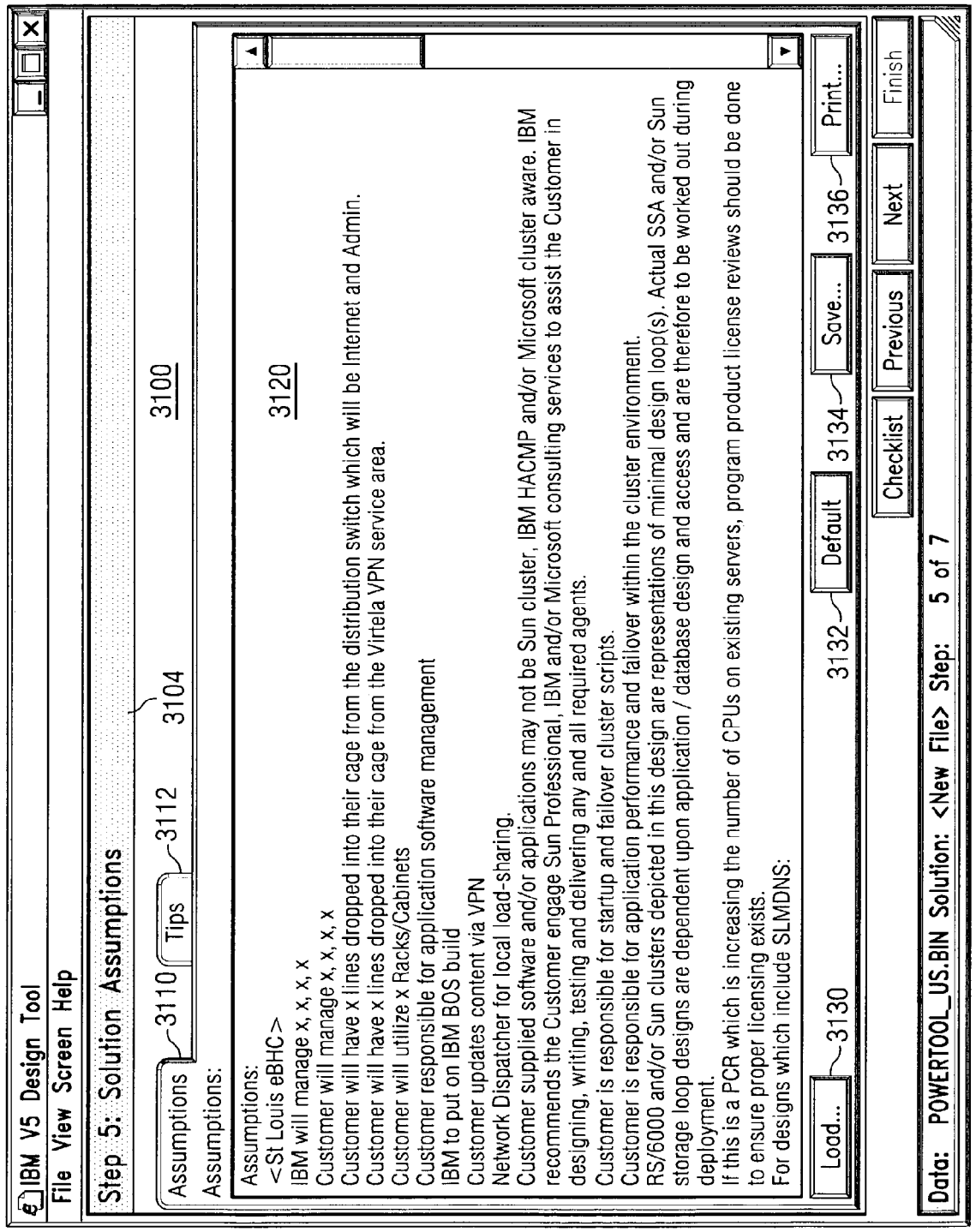
FIG. 31 depicts the Solution Assumptions Screen.

FIG. 31 depicts Solution Assumptions Screen (SAS) 3100 at Assumptions Tab 3110. Assumptions Tab 3110 has Assumptions Display 3120, Load Button 3130, Default Button 3132, Save Button 3134 and Print Button 3136. Boilerplate assumptions are provided. The user may edit, save or print the assumptions. Alternatively, the user may load a text file containing the user's preferred assumption.

Figure 32:
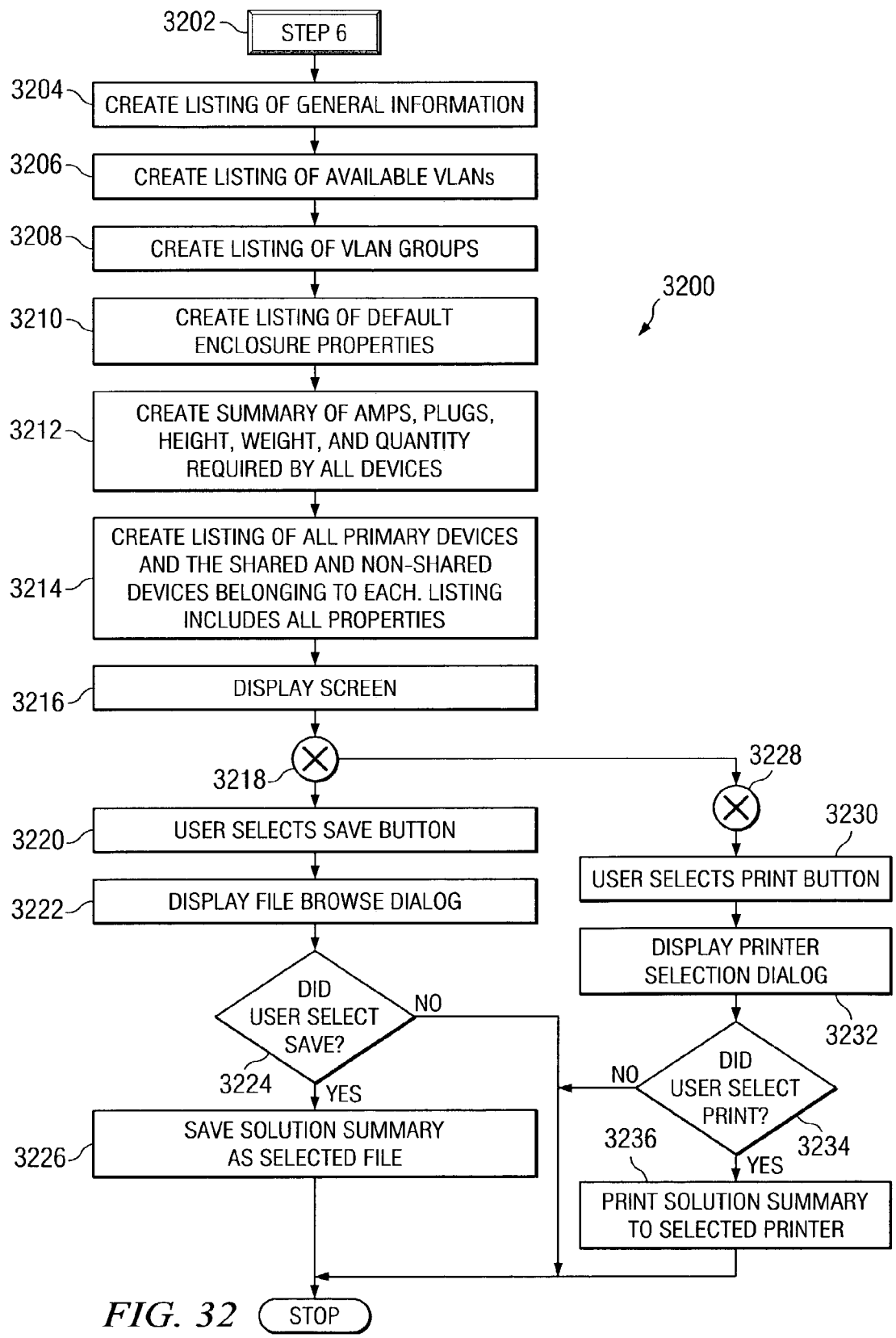
FIG. 32 depicts a flow chart of the Solution Summary process.

FIG. 32 depicts the Flow Chart for Solution Summary Process (SSP) 3200 (see FIG. 33 for a depiction of the Solution Summary Screen) that is activated when the Solution Summary Screen is activated. SSP 3200 begins when Step 6 is selected (3202). SSP 3200 creates a listing of general information (3204), creates a listing of Available VLANs (3206), creates a listing of Default Enclosure properties (3210), creates a summary of amps, plugs, height, weight and quantity required by all devices (3212), creates a listing of all primary devices and the shared and non-shared devices belonging to each, including all properties (3214) and displays Solution Summary Screen 3300 (see FIG. 33). At junction 3218 the user may select Save Button 3350 or Print Button 3352. If the user selects Save Button 3350, SSP 3200 displays the file browse dialog (3222) and a determination is made whether the user selected save (3224). If not, SSP 3200 stops. If so, the solution summary is saved as the selected file (3226) and SSP 3200 stops. If the user selects Print Button 3352 (3230), SSP 3200 displays the printer selection dialog (3232) and a determination is made whether the user selected Print (3234). If not, SSP 3200 stops. If so, the command to print the solution summary is sent to the selected printer (3236) and SSP 3200 stops.

Figure 33:
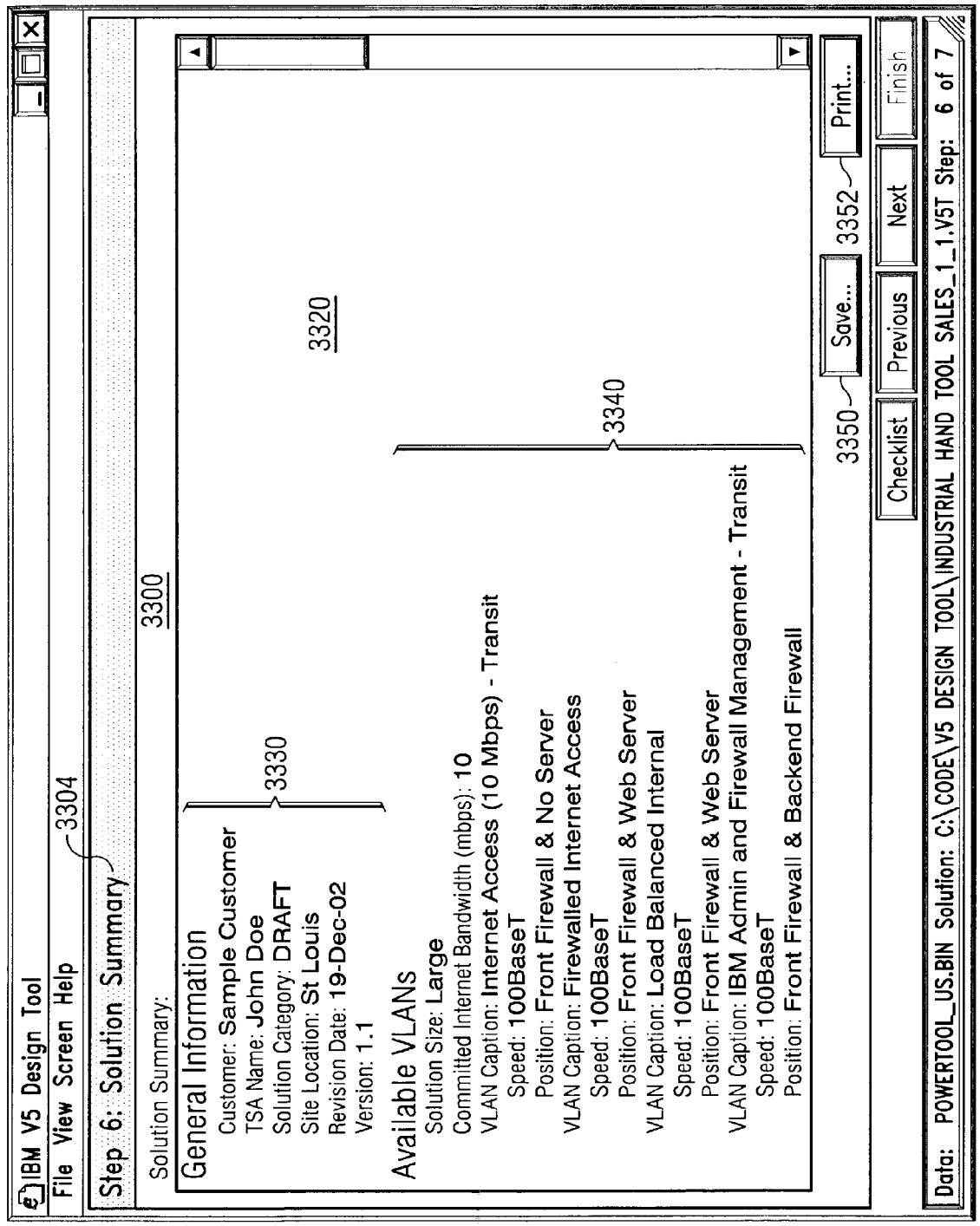
FIG. 33 depicts the Solution Summary Screen

FIG. 33 depicts Solution Summary Screen (SSS) 3300. SSS 3300 has Solution Summary Display 3320 having a General Information areas 3330 and an Available VLANs area 3340. SSS 3300 has Save Button 3350 and Print Button 3352. In the preferred embodiment, the items that are shown and their order of appearance are as follows: General Information, Available VLANs, VLAN Groups, Default Enclosure, Space and Power Requirements, and Device Listing.

Figure 34:
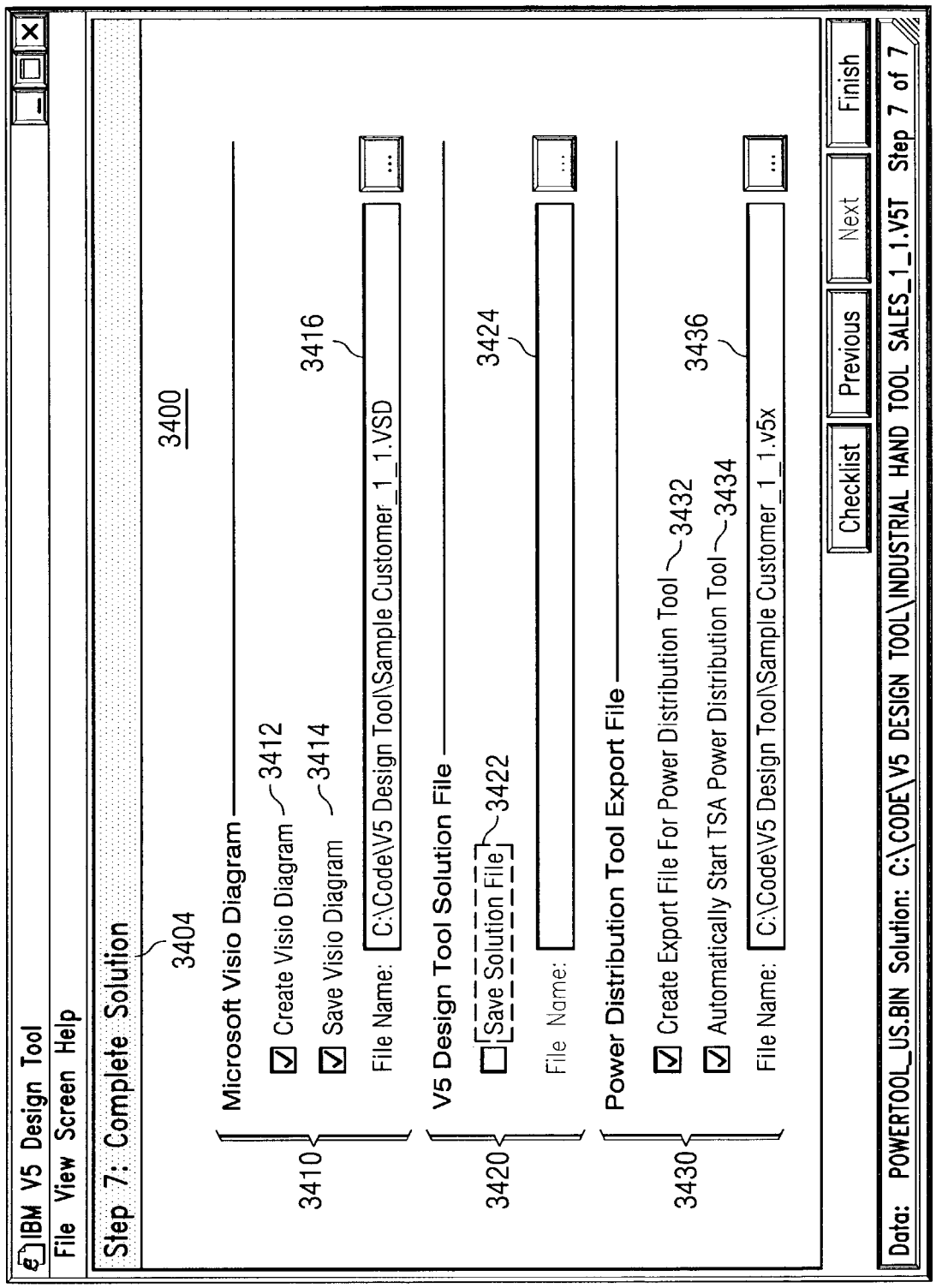
FIG. 34 depicts the Finish Screen

FIG. 34 depicts Finish Screen (FS) 3400 having title, "Step 7: Complete Solution" 3404, Diagram area 3410, Solution File area 3420 and Power Distribution Tool area 3430. Diagram area 3410 has Create Diagram checkbox 3412, Save Diagram checkbox 3414, and File Name window 3416. Diagram area 3410 also has a Message Area that can alert the user to problems in the solution. For example, a message may be "Missing hardware or connectivity." Solution File area 3420 has Save Solution File check box 3422 and File Name window 3424. Power Distribution Tool area 3420 has Create Export File for Power Distribution Tool check box 3432, Automatically Start Power Distribution Tool check box 3434 and File Name Window 3436.

Figure 35A:
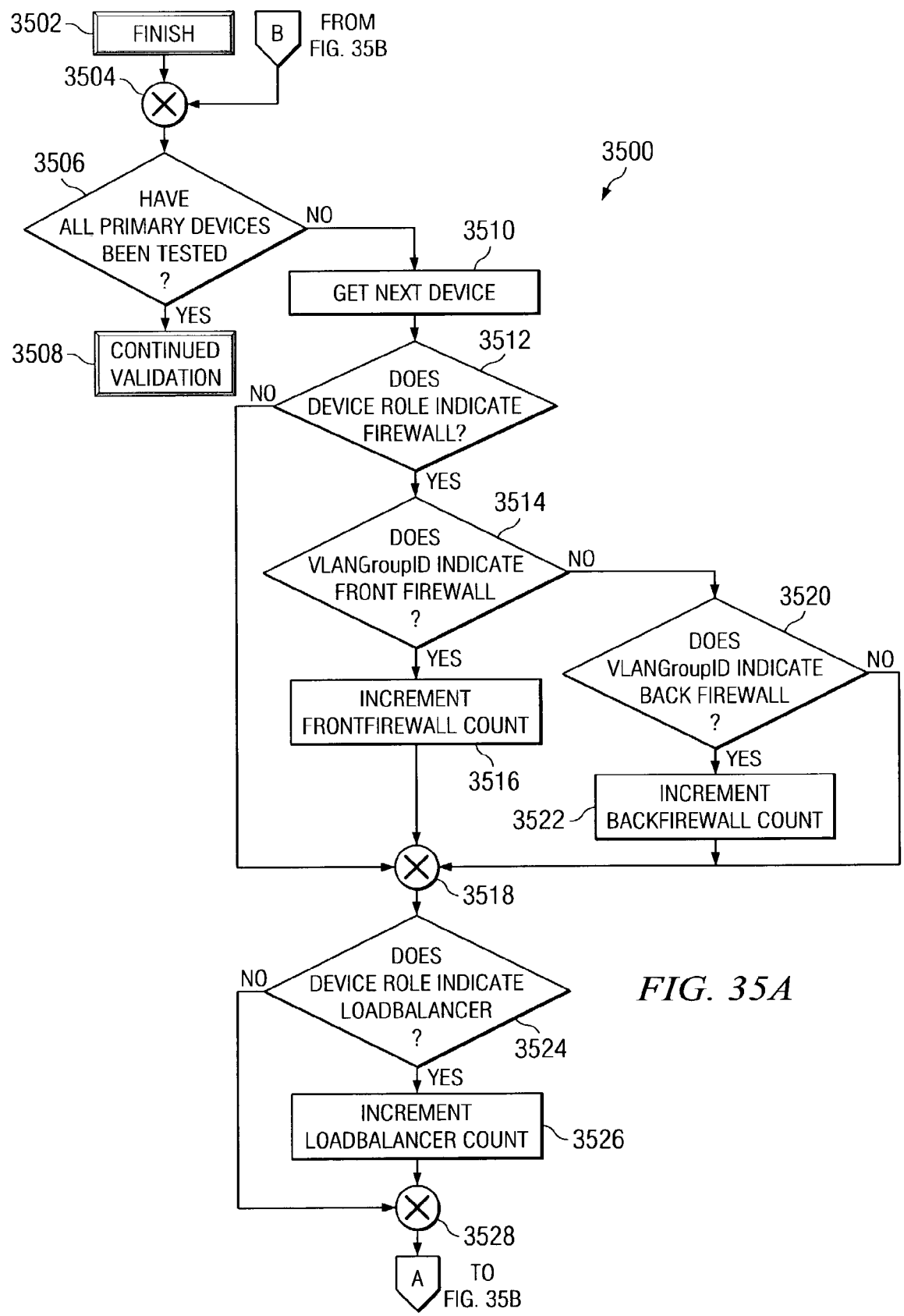
FIG. 35A depicts a Flow Chart for the Finish button.
Figure 35B:
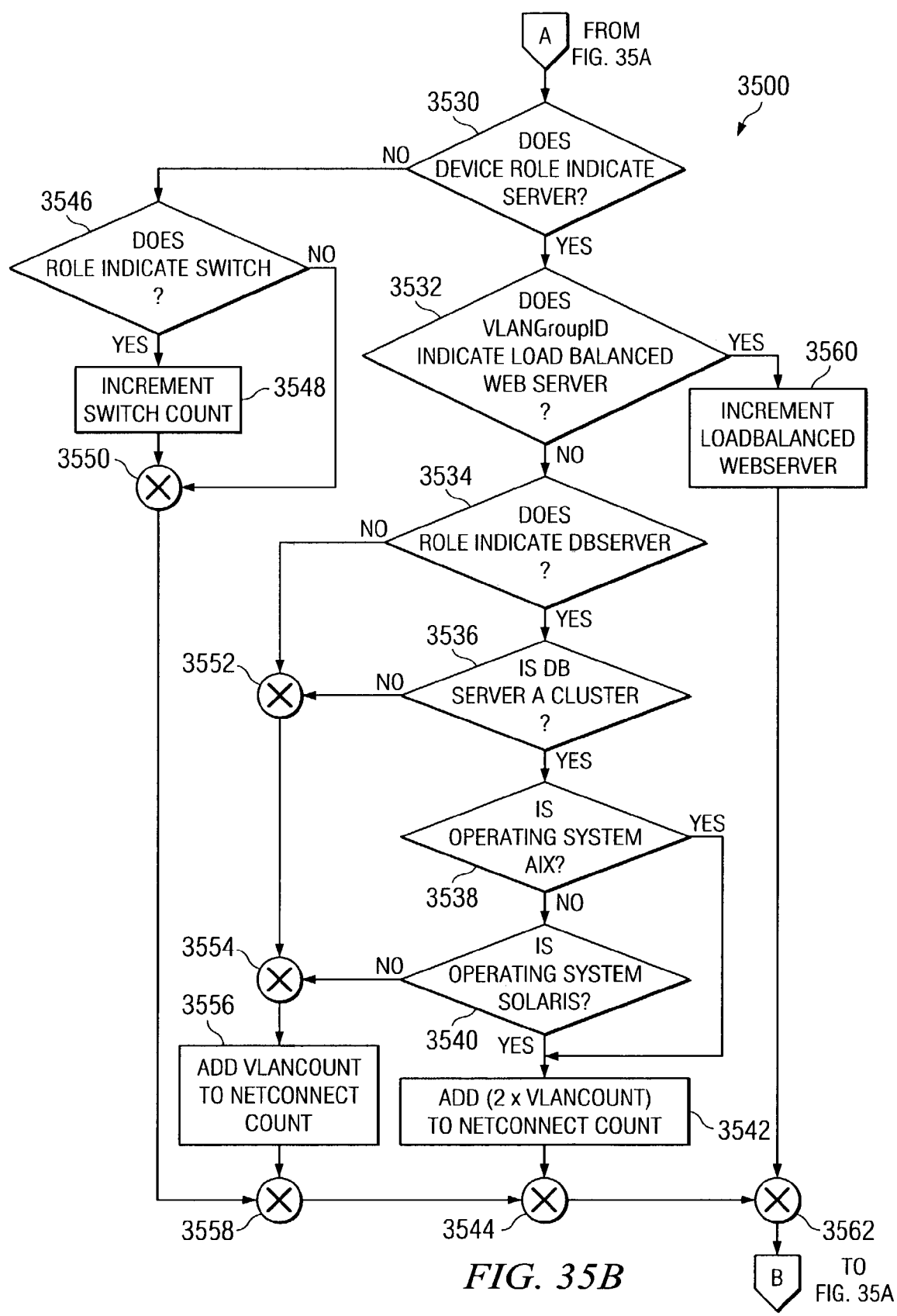
FIG. 35B depicts a Flow Chart for the Finish button.

FIGS. 35A and 35B depict the Flow Chart for Finish Sequence Process (FSP) 3500 that takes place when the user activates Finish button 328 (see FIG. 3). Referring to FIG. 35A, FSP 3500 starts upon activation of Finish Button 328 (3502) and a determination is made whether all primary devices have been tested (3506). If not, FSP 3500 gets the next device (3510) and determines whether the device ROLE indicates FIREWALL (3512). If not, FSP 3500 goes to step 3524. If so, a determination is made whether VLANGroupID indicates Front Firewall (3514). If not, a determination is made whether VLANGroupID indicates Back Firewall (3520). If so, the Back Firewall count is incremented, and FSP 3500 goes to step 3524. If at step 3514, VLANGroupID indicates Front Firewall, then the front firewall count is incremented (3516) and FSP 3500 goes to step 3524. A determination is made whether device role indicates loadbalancer (3524). If so, the loadbalancer count is incremented (3526). If not, (referring now to FIG. 35B) a determination is made whether the device role indicates Server (3530). If the device role does not indicate server, a determination is made whether the role indicates Switch (3546). If so, the switch count is incremented (3548) and FSP 3500 returns to step 3506 (see FIG. 35A). If not, FSP 3500 returns to step 3506. If at step 3530, the device role indicates Server, a determination is made whether VLANGroupID indicates Load Balanced web Server. If so, FSP 3500 increments loadbalanced webserver and goes to step 3506. If not, a determination is made whether Role indicates Data Base (DB) Server (3534). If not, FBP 3500 adds VLANCount to Netconnect Count (3556) and returns to step 3504. If so, a determination is made whether the DB server is a cluster (3536). If not, FBP 3500 adds VLANCount to Netconnect Count and returns to step 3506. If so, a determination is made whether the Operating System is AIX (3538). If so, FBP 3500 Adds (2×VLANCount) to Netconnect Count and goes to step 3506. If not, a determination is made whether the operating system is Solaris (3540). If not, FBP 3500 adds VLANcount to Netconnect Count and goes to step 3506. If the operating system is Solaris, FBP 3500 adds (2×VLANCount) to Netconnect Count and goes to step 3506. At step 3506, if a determination is made that all primary devices have been tested, then the Continued Validation Process (CVP) is activated (3508).

The Design Tool will register a problem and prohibit the user from creating a drawing if any of the following situations exist: if any firewall, load balancer, intrusion detection device or server lacks a VLAN group assignment, and if no front or back firewalls are configured on a large-size solution or no firewalls are configured on a medium-size solution. The user will be directed to add the missing hardware items and assign VLAN groups to the items missing connectivity.

Figure 36:
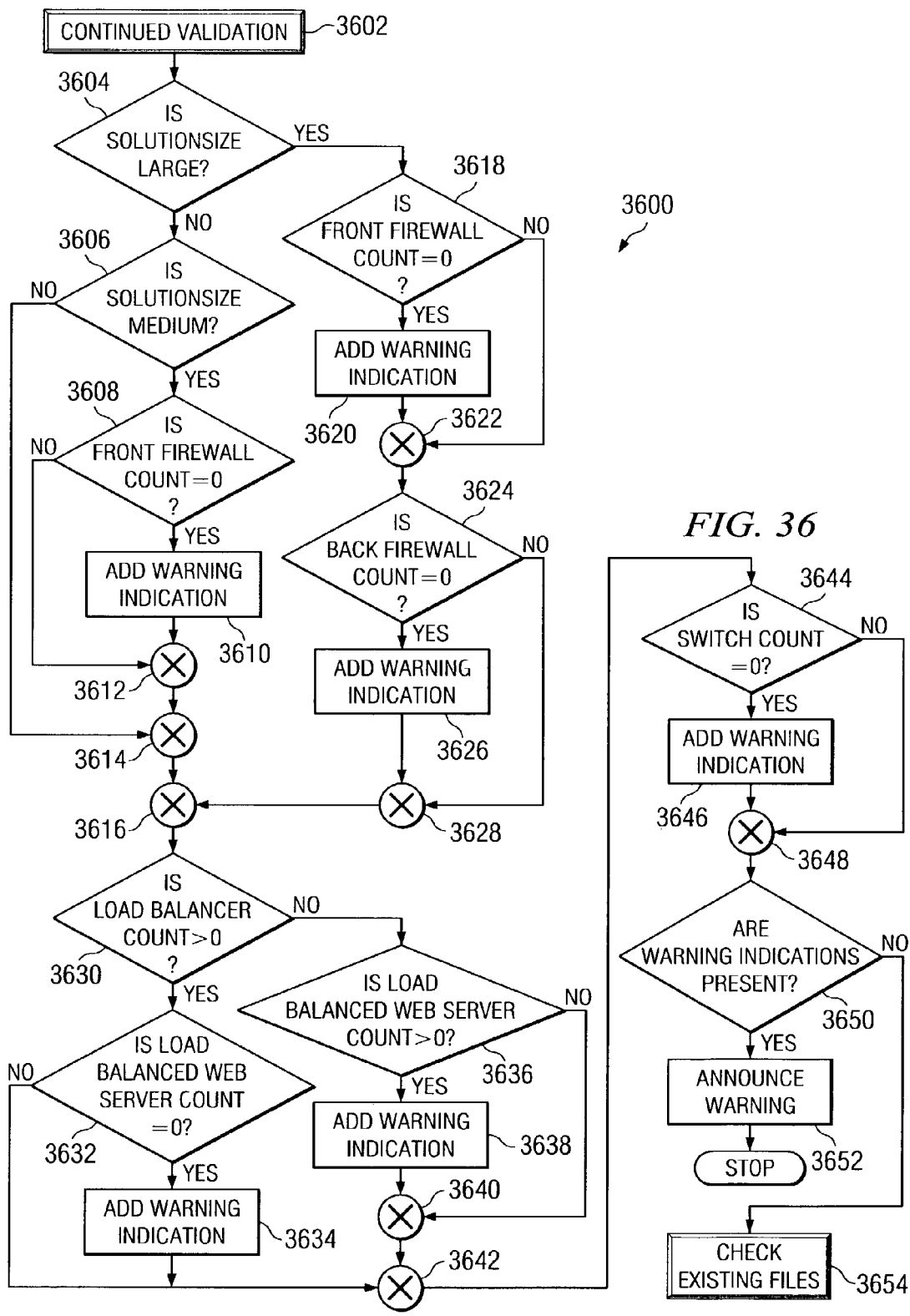
FIG. 36 depicts a Flow Chart for the Validation process.

FIG. 36 depicts a flow chart for Continued Validation Process 3600 which begins when activated by FSP 3500. FSP 3500 activates CVP 3600 and CVP 3600 begins (3602). A determination is made whether the solution size is large. If so, a determination is made whether the front firewall count is equal to 0. If so, a warning indication is added. If not, a determination is made whether the back firewall count is 0. If so, a warning indication is added. If not, CVP 3600 goes to step 3630. If at step 3604, a determination is made that the solution size is not large, then a determination is made whether the solution size is medium. If not, CVP 3600 goes to step 3630. If the solution size is medium, then a determination is made whether the front firewall count is equal to 0. If so, a warning indication is added. If not, a determination is made whether the load balancer count is greater than 0. If the load balancer count is greater than 0, then a determination is made whether the load balanced web server count equals 0. If so, a warning indication is added (3634) and CVP 3600 goes to step 3644. If not, CVP 3600 goes to step 3644. If at step 3630, the load balancer count was determined to be greater than 0, then a determination is made whether the load balanced web server count is greater than 0. If so, a warning indication is added (3638). If not, CVP 3600 goes to step 3644.

At step 3644, a determination is made whether the switch count is equal to 0. If so, a warning indication is added (3646). If not, a determination is made whether warning indications are present (3650). If so, the warnings are announced (3652) and DVP 3600 stops. If not, CVP 3600 initiates the Check Existing Files Process (3654).

Figure 37:
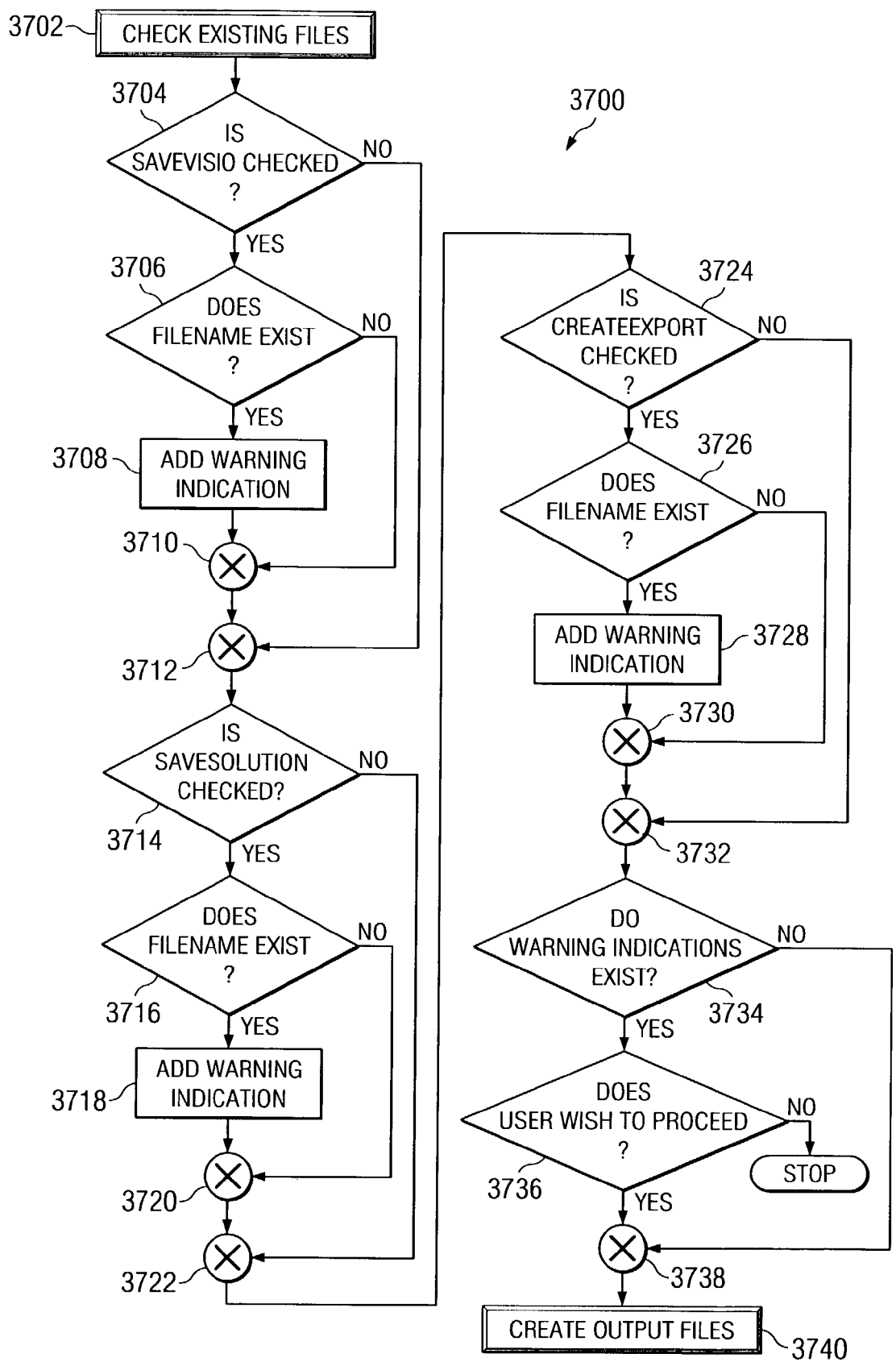
FIG. 37 depicts a Flow Chart for the Check Existing Files process.

FIG. 37 depicts the flow chart for Check Existing Files Process (CEFP) 3700. CFEP 3700 begins when the Check Existing Files Process is activated (3702). A determination is made as to whether Save Visio Diagram 3412 is checked (3704). If not CEFP 3700 goes to step 3724. If so, a determination is made whether a file name exists (3706). If so a warning indication is added (3708) and CEFP 3700 goes to step 3714. If not, a determination is made whether Save Solution File 3422 is checked (3714). If Save Solution File 3422 is not checked, CEFP 3700 goes to step 3724. If Save Solution File 3422 is checked, a determination is made whether a file name exists (3716). If a file name exists, a warning indication is added (3718). If a file name does not exist, CEFP 3700 goes to step 3724.

At step 3724, a determination is made whether Create Export 3432 is checked (3724). If Create Export 3432 is checked, a determination is made whether a file name exists (3726). If so, a warning indication is added (3728) and CEFP 3700 goes to step 3734. If a file name does not exist, CEFP 3700 goes to step 3734.

At step 3734 a determination is made whether warning indications exist. If warning indications exist, a determination is made whether the user wishes to proceed (3736). If the user does not wish to proceed, CEFP 3700 stops. If the user wishes to proceed, CEFP 3700 activates Create Output Files Process (COFP) 3800 (3740).

Figure 38A:
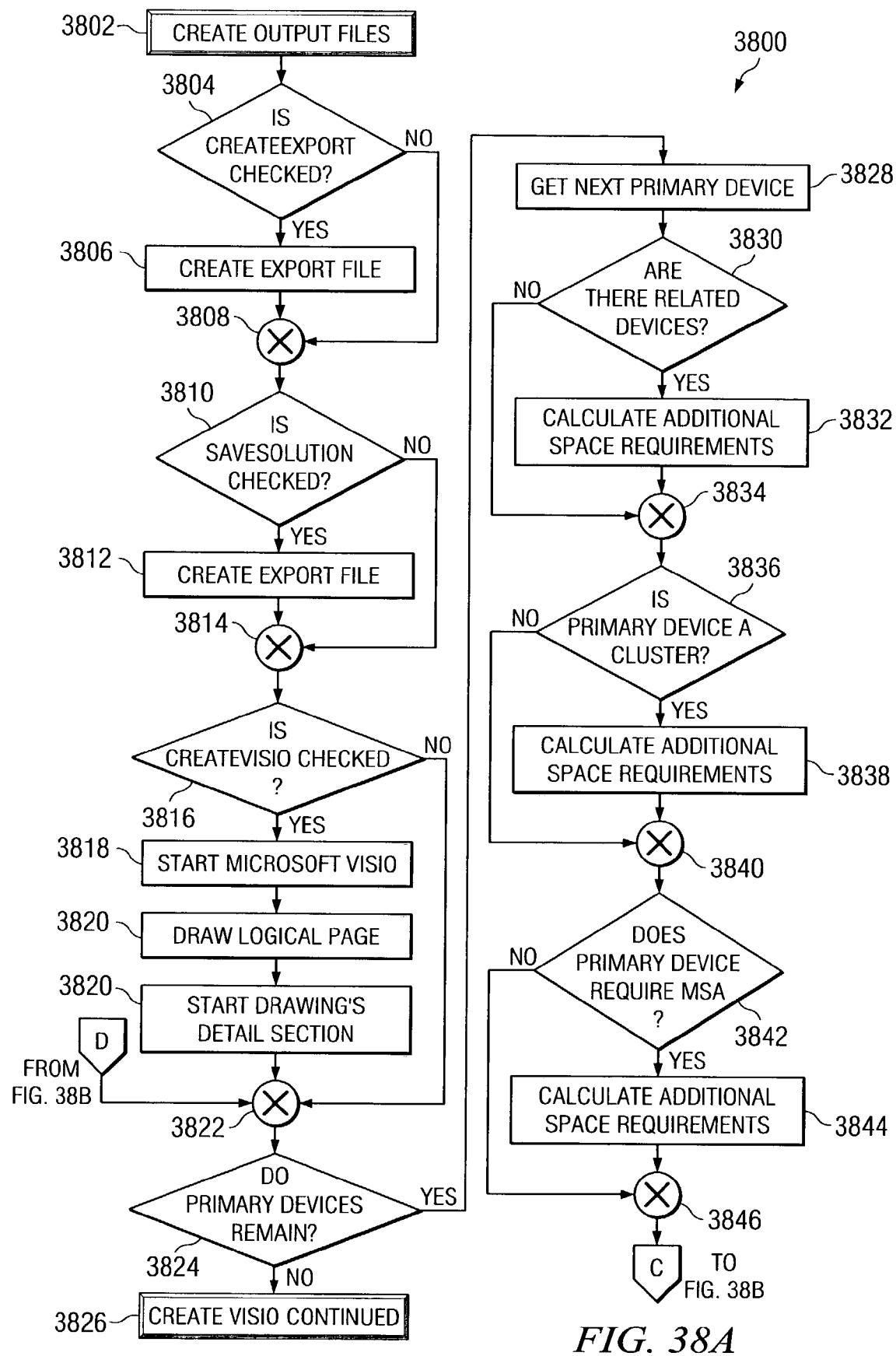
FIG. 38A depicts a Flow Chart for the Create Output Files process.
Figure 38B:
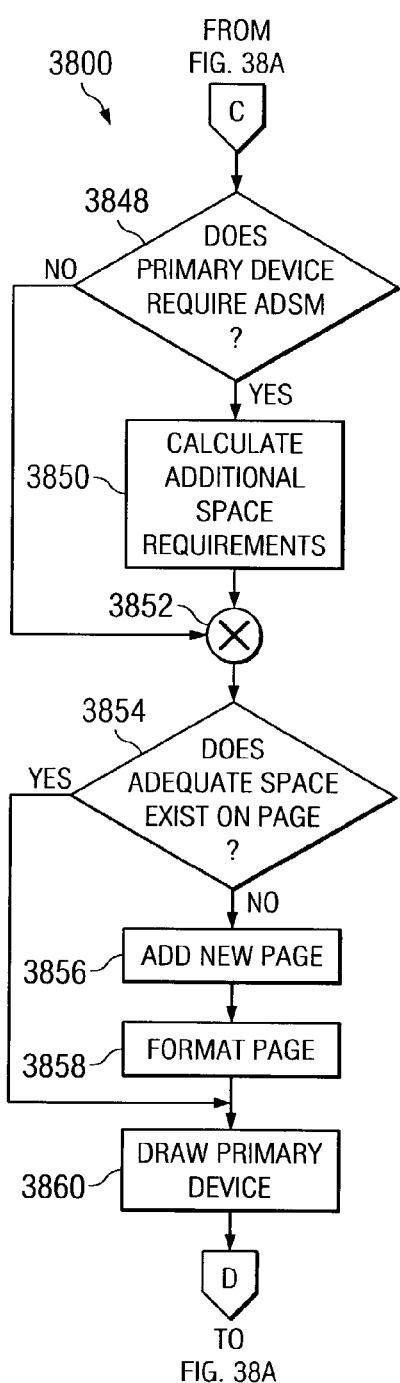
FIG. 38B depicts a Flow Chart for the Create Output Files process.

FIG. 38A and FIG. 38B depict the flow chart for Create Output Files Process (COFP) 3800. COFP 3800 begins when activated (3802) and a determination is made whether Create Export File 3432 has been checked (3804). If so, an export file is created (3806) and COFP 3800 goes to step 3816. If not, COFP 3800 goes to step 3816. A determination is made whether Create Visio® Diagram 3412 has been checked (3816). If so, Microsoft Visio® is started (3818), a logical page is drawn (3820), the drawing's detail section is started (3820) and a determination is made as to whether primary devices remain (3824). If no primary devices remain, then COFP 3800 will activate Create Visio Process 3900 (3826). If Primary devices remain, COFP 3800 gets the next primary device 3828 and makes a determination whether there are related devices (3830). If there are related devices, additional space requirements are calculated (3832) and COFP 3800 goes to step 3826. If there are no related devices, a determination is made whether the primary device is a cluster (3836). If the primary device is a cluster, additional space requirements are calculated (3838) and COFP 3800 goes to step 3842. If the primary device is not a cluster, a determination is made whether the primary device requires MSA (3842). If so, additional space requirements are calculated (3844) and COFP 3800 goes to step 3848 (see FIG. 38B). If not, a determination is made whether the primary device requires ADSM (3848) (see FIG. 38B). If so, additional space requirements are calculated (3850) and COFP 3800 goes to step 3854. If not, a determination is made whether adequate space exists on the page (3854). If not, a new page is added (3856), a new page is formatted (3858), the primary device is drawn (3860), and COFP 3800 goes to step 3824 (see FIG. 38A).

Figure 39:
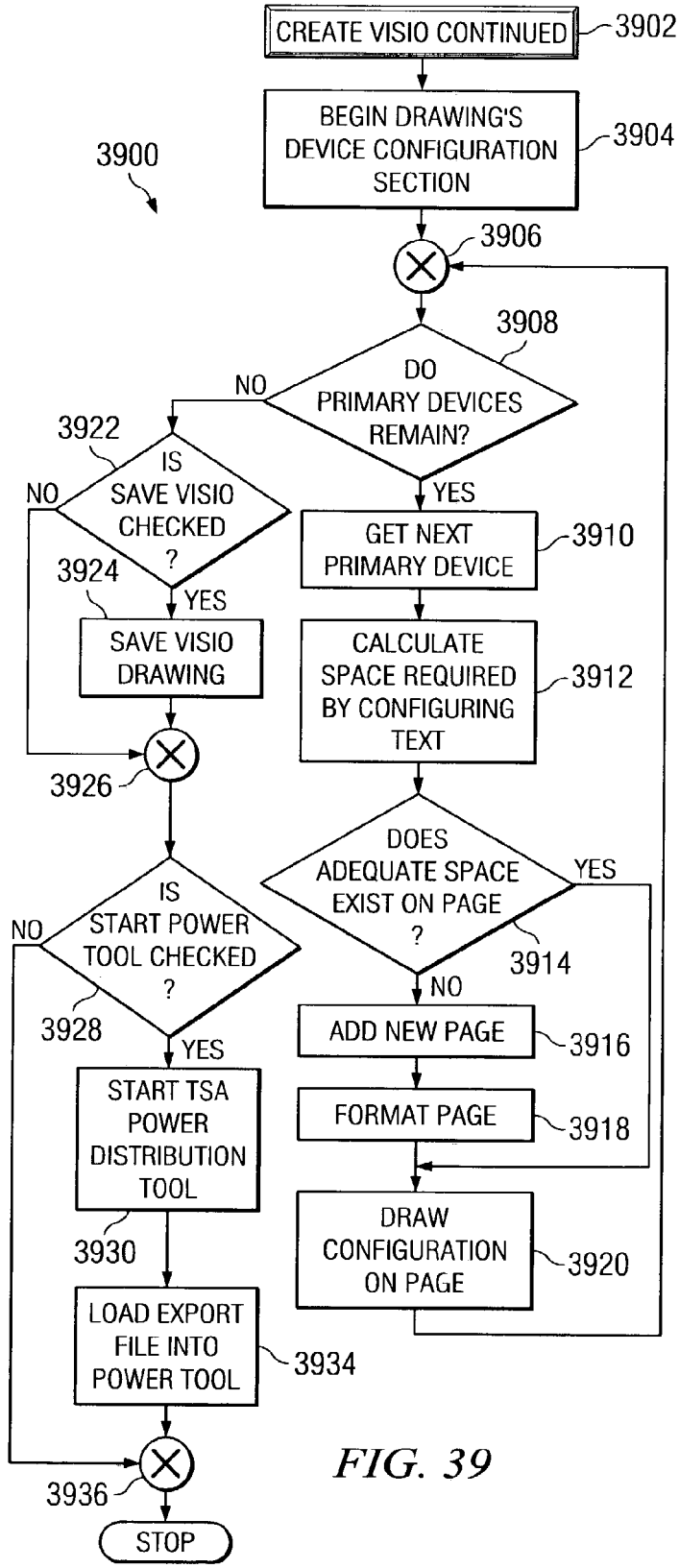
FIG. 39 depicts a Flow Chart for the Create Visio process.

FIG. 39 depicts the flow chart for Create Visio Process (CVP) 3900. CVP 3900 begins when CVP 3900 is activated (3902) and begins drawing the device configuration section (3904). A determination is made whether primary devices remain (3908). If not, a determination is made whether Save Visio is checked (3922). If so, the Visio drawing is saved (3924) and CVP 3900 goes to step 3928. If not, a determination is made whether Start Power Tool is checked (3928). If not, CVP 3900 stops. If so, the Power Distribution Tool is started (3930), the export file is loaded into the Power Distribution Tool (3934) and CVP 3900 stops.

If at step 3908 a determination was made that primary devices remain (3908), then CVP 3900 gets the next primary device (3910) and calculates the space required by configuring text (3912). Next a determination is made whether adequate space exists on the page (3914). If adequate space exists, CVP 3900 goes to step 3920. If adequate space does not exist, a new page is added (3916) and the page is formatted (3912). Next the configuration is drawn on the page (3920) and CVP 3900 returns to step 3908.

Figure 40A:
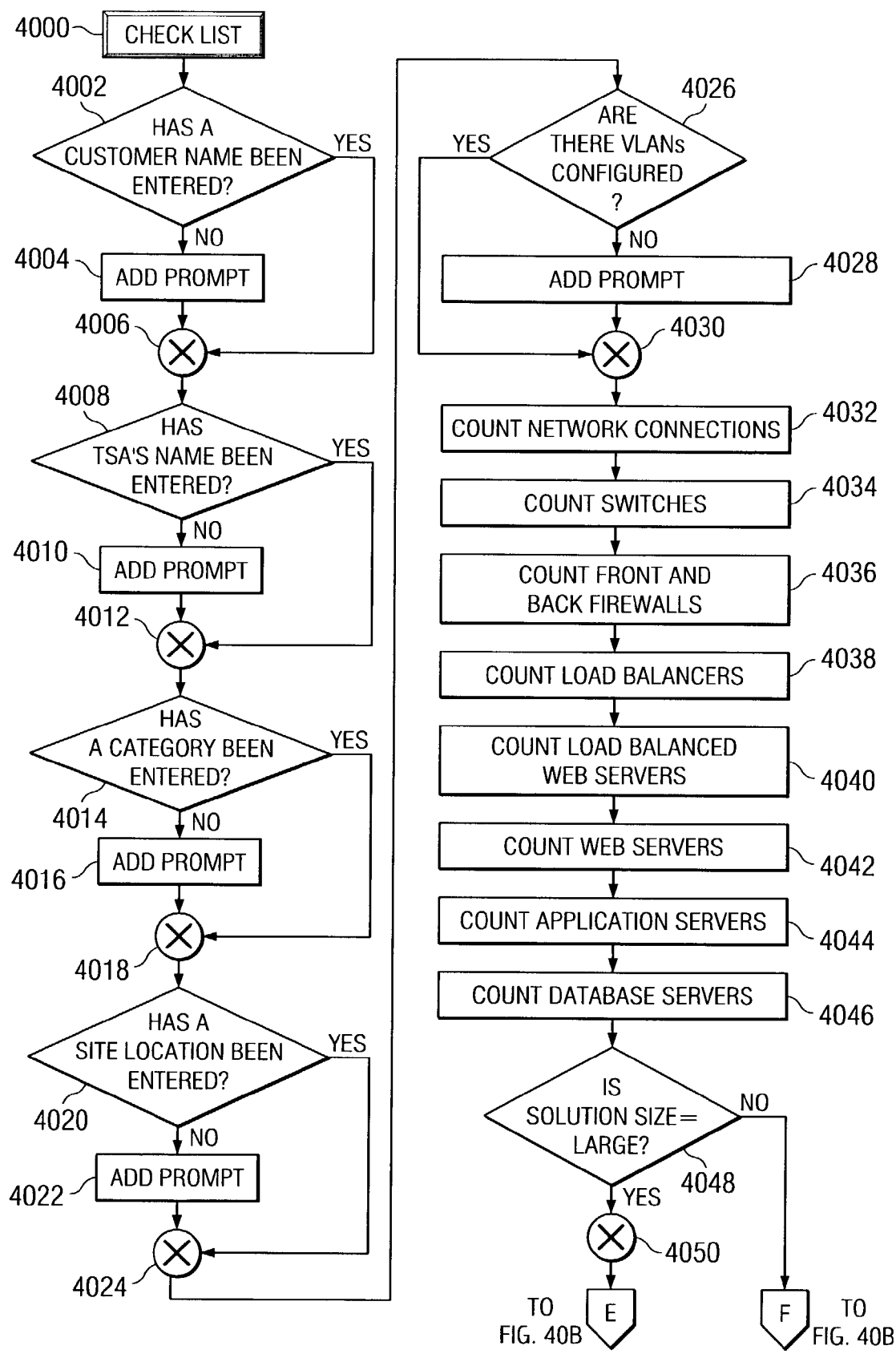
FIG. 40A depicts a Flow Chart for the Checklist Button.
Figure 40B:
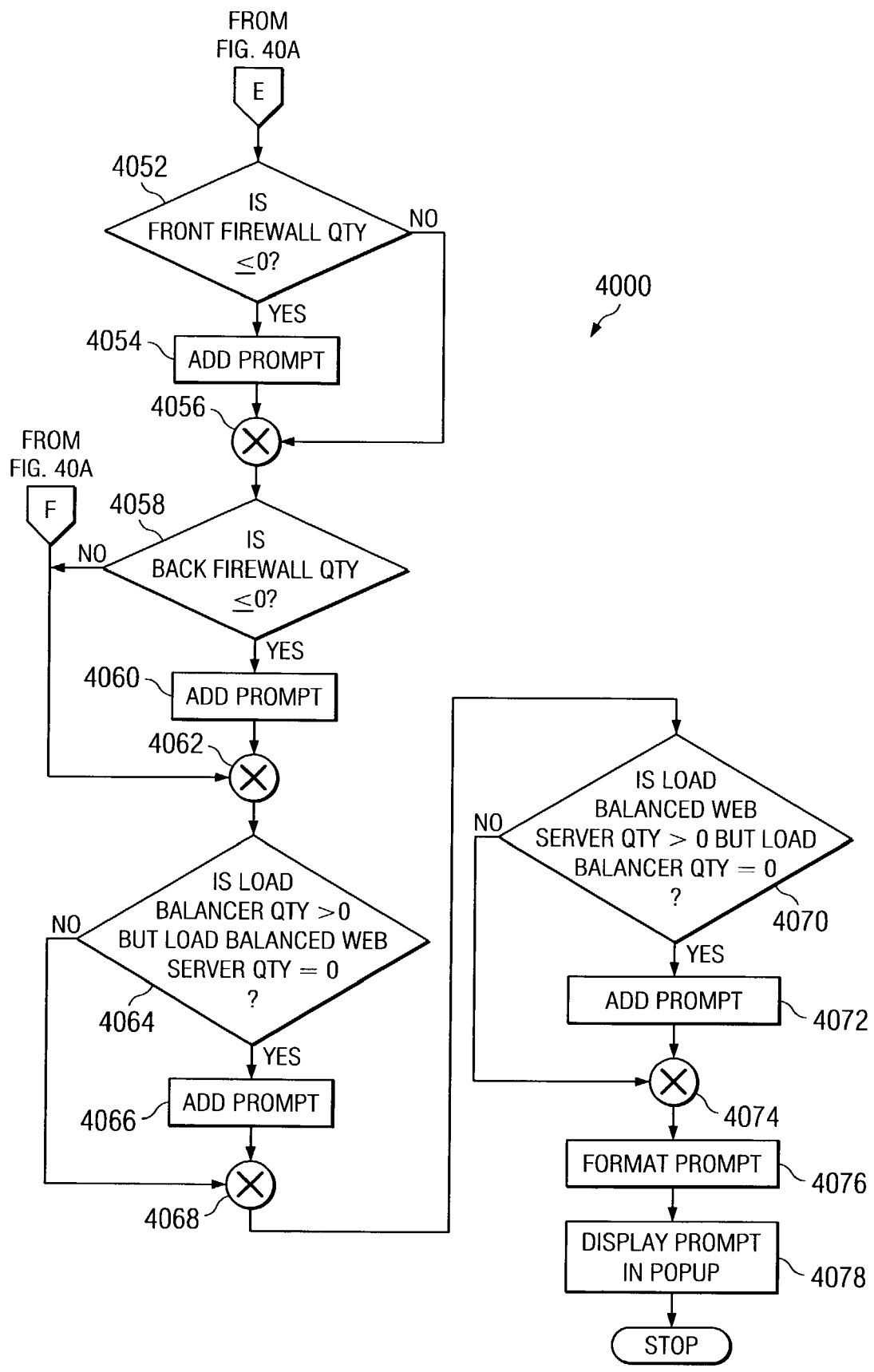
FIG. 40B depicts a Flow Chart for the Checklist Button.

FIG. 40 depicts a Flow Chart for Checklist Button Process (CBP) 4000. CBP 4000 begins when the user activates Checklist Button 322 (see FIG. 3). A determination is made whether a customer name has been entered (4002). If not, a prompt is added (4004). If so, a determination is made whether the Technical Solution Architect's (TSA) name has been entered (4008). If not, a prompt is added (4010). If so, a determination is made whether a category has been entered (4014). If not, a prompt is added (4016). If so, a determination is made whether a site location has been entered (4020). If not, a prompt is added (4022). If so, a determination is made whether there are VLANs configured (4026). If not, a prompt is added (4028). If so, network connections are counted (4032), switches are counted (4034), front and back firewalls are counted (4036), load balancers are counted (4038), load balanced web servers are counted (4040), web servers are counted (4042), application servers are counted (4044) and data base servers are counted (4046). Next, a determination is made whether the solution size is large (4048). If the solution size is large, a determination is made whether the firewall quantity is less than or equal to 0 (4052) (See FIG. 40B). If so, a prompt is added (4054). If not, a determination is made whether the back firewall quantity is less than or equal to 0 (4058). If so a prompt is added (4060). If not, a determination is made whether load balancer quantity is greater than 0 but load balanced web server quantity is equal to 0 (4064). If so, a prompt is added (4066). If not, a determination is made whether load balanced web server quantity is greater than 0 but the load balancer quantity is equal to 0 (4070). If so, a prompt is added (4072). If not, prompts are formatted (4076) and prompts are displayed in a popup (4078) and CBP 4000 stops.

If at step 4048, a determination was made that the solution size was not large, then CBP 4000 goes to step 4064 and proceeds as discussed above.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed:

1. A computer controlled method, comprising:
accessing, by a computer, a plurality of available virtual local area networks, a plurality of configured virtual local area network groups, a plurality of available primary devices, and a plurality of available related devices;
displaying, by the computer, a plurality of graphical user interfaces to obtain a plurality of user inputs defining a plurality of configured virtual local area networks, a plurality of configured virtual local area network groups, a plurality of configured primary devices and a plurality of configured related devices;
responsive to receiving the plurality of user inputs, creating a plurality of automatically generated instructions, and sending the plurality of automatically generated instructions to a separate and independent drawing program in order to cause the separate and independent drawing program to create and to print a diagram of the plurality of configured primary devices and the plurality of configured related devices wherein a connectivity for each configured primary device and each configured related device is defined by a virtual local area network group identification created as part of the user input; and
wherein the separate and independent drawing program creates and prints the diagram of the network solution in response to the plurality of automatically generated instructions.

2. The computer controlled method of claim 1 further comprising displaying a Select Available VLANs Screen.

3. The computer controlled method of claim 2 further comprising entering a Committed Internet Bandwidth at the Select Available VLANs Screen.

4. The computer controlled method of claim 2 further comprising adding a VLAN at the Select Available VLANs Screen.

5. The computer controlled method of claim 1 further comprising checking placement of a VLAN using a Solution Size window.

6. The computer controlled method of claim 1 further comprising displaying an Add Devices Screen having a Primary devices List, a Shared Related Devices List and a Non-Shared Devices List.

7. The computer controlled method of claim 1 further comprising editing selected devices properties.

8. The computer controlled method of claim 7 wherein the step of editing selected devices properties includes editing a Role property.

9. The computer controlled method of claim 7 wherein the step of editing selected devices properties includes editing a VLAN Group property.

10. The computer controlled method of claim 7 wherein the step of editing selected devices properties includes editing an electrical specification.

11. The computer controlled method of claim 7 wherein the step of editing selected devices properties includes editing a Physical Specification property.

12. The computer controlled method of claim 7 wherein the step of editing selected devices properties includes editing an MSA Specification property.

13. The computer controlled method of claim 7 wherein the step of editing selected devices properties includes editing an ADSM Specification property.

14. The computer controlled method of claim 7 wherein the step of editing selected devices properties includes editing an Interconnect Specification.

15. The computer controlled method of claim 1 further comprising the step of executing a Role Change Process.

16. The computer controlled method of claim 1 further comprising the step of executing an Add Item Process.

17. The computer controlled method of claim 1 further comprising the step of executing a Device Configuration Process.

18. The computer controlled method of claim 1 further comprising the step of executing an Edit Interconnects Process.

19. The computer controlled method of claim 1 further comprising the step of executing a Solution Summary Process.

20. The computer controlled method of claim 1 further comprising the step of executing a Finish Sequence Process.

21. The computer controlled method of claim 1 further comprising the step of executing a Create Output Files Process.

22. The computer controlled method of claim 1 further comprising the step of executing a Save Visio Process.

23. The computer controlled method of claim 1 further comprising sending an export file to a Power Distribution Tool.

24. The computer controlled method of claim 1 further comprising the step of prohibiting the user from creating a drawing if any firewall, load balancer, intrusion detection device or server lacks a VLAN Group assignment.

25. The computer controlled method of claim 1 further comprising the step of prohibiting the user from creating a drawing if no firewalls are configured.

26. The computer controlled method of claim 1 further comprising the step of executing a Checklist Button process.

27. The computer controlled method of claim 1 further comprising the step of executing a Data Validation Process.

28. The computer controlled method of claim 1 further comprising the step of executing a Continued Validation Process.

29. An apparatus for causing a drawing program to generate a diagram of a network solution in response to a plurality of inputs from a user and a plurality of automatically generated instructions that control the drawing program, comprising:
a computer;
a database in the memory of the computer;
a drawing program installed in the memory of the computer;
a design tool program installed in the memory of the computer;
wherein the drawing program is separate and independent of the design tool program;
wherein, responsive to a plurality of user inputs, the design tool program creates a plurality of automatically generated instructions and sends the plurality of automatically generated instructions to the drawing program to cause the separate and independent drawing program to create and print a diagram of a plurality of configured primary devices and a plurality of configured related devices, wherein a connectivity for each configured primary device and each configured related device is defined by a virtual local area network group identification created as part of the user input; and wherein the separate and independent drawing program creates and prints the diagram of the network solution in response to the plurality of automatically generated instructions.

30. The apparatus of claim 29 wherein the database further comprises a plurality of available virtual local limited area networks, a plurality of configured virtual local limited area network groups, a plurality of available primary devices and a plurality of available related devices.

31. The apparatus of claim 29 further comprising a plurality of graphical user interfaces to obtain user input defining a plurality of configured virtual local area networks, a plurality of configured virtual local area network groups, a plurality of configured primary devices and a plurality of configured related devices; wherein the plurality of graphical user interfaces are displayed by the design tool program.

32. The apparatus of claim 29 further comprising a Select Available VLANs graphical user interface.

33. The apparatus of claim 29 further comprising a means for checking placement of a VLAN.

34. The apparatus of claim 29 further comprising an Add Devices graphical user interface having a Primary devices List display area, a Shared Related Devices List display area and a Non-Shared Devices List display area.

35. The apparatus of claim 29 further comprising a means for editing selected devices properties.

36. The apparatus of claim 35 further comprising a means for editing a Role property.

37. The apparatus of claim 35 further comprising a means for editing a VLAN Group property.

38. The apparatus of claim 35 further comprising a means for editing an electrical specification.

39. The apparatus of claim 35 further comprising a means for editing a Physical Specification property.

40. The apparatus of claim 35 further comprising a means for editing an Interconnect Specification.

41. The apparatus of claim 29 wherein the design tool program further comprises a Role Change Program.

42. The apparatus of claim 29 wherein the design tool program further comprises an Add Item Program.

43. The apparatus of claim 29 wherein the design tool program further comprises a Device Configuration Program.

44. The apparatus of claim 29 wherein the design tool program further comprises an Edit Interconnects Program.

45. The apparatus of claim 29 wherein the design tool program further comprises a Solution Summary Program.

46. The apparatus of claim 29 wherein the design tool program further comprises a Finish Sequence Program.

47. The apparatus of claim 29 wherein the design tool program further comprises a Create Output Files Program.

48. The apparatus of claim 29 wherein the design tool program further comprises a Save Visio Process.

49. The apparatus of claim 29 wherein the design tool program further comprises a means for creating export file for a Power Distribution Tool.

50. The apparatus of claim 29 wherein the design tool program further comprises a means for prohibiting the user from creating a drawing if any firewall, load balancer, intrusion detection device or server lacks a VLAN Group assignment.

51. The apparatus of claim 29 wherein the design tool program further comprises a means for prohibiting the user from creating a drawing if no firewalls are configured.

52. The apparatus of claim 29 wherein the design tool program further comprises a Checklist Button Program.

53. The apparatus of claim 29 wherein the design tool program further comprises a Data Validation Program.

54. The apparatus of claim 29 wherein the design tool program further comprises a Continued Validation Program.

55. A computer program product comprising:
a computer-readable storage medium;
a plurality of instructions stored in the computer-readable storage medium, the plurality of instructions adapted to cause a processor of a computer to perform steps comprising:
displaying a plurality of graphical user interfaces;
responsive to the plurality of graphical user interfaces, receiving a plurality of user inputs wherein the plurality of user inputs defines the network solution;
responsive to receiving the plurality of user inputs, automatically generating a second plurality of instructions and sending the second plurality of instructions to a separate and independent drawing program, wherein the second plurality of instructions are adapted to cause the drawing program to create and print a diagram of the network solution; and
wherein a connectivity for each of a plurality of devices in the network solution is defined by a virtual local area network identification assigned to each of the plurality of devices;
wherein the separate and independent drawing program creates and prints the diagram of the network solution in response to the plurality of automatically generated instructions; and
wherein the separate and independent drawing program is MICROSOFT VISIO®.

56. The computer program product of claim 55 wherein the second plurality of instructions are further configured to cause the drawing program to create a diagram of a plurality of configured primary devices, a plurality of configured related devices, the connectivity of the plurality of configured primary devices, and the connectivity of the plurality of configured related devices.

57. The computer program product of claim 55 wherein the second plurality of instructions are further configured to cause the processor to connect to a database having a plurality of available primary devices and a plurality of available related devices.

58. The computer program product of claim 57 wherein the plurality of available related devices includes a plurality of shared related devices and a plurality of non-shared related devices.

59. The computer program product of claim 55 wherein the plurality of graphical user interfaces are configured to receive user input defining a plurality of configured virtual local area networks, a plurality of configured virtual local area network groups, a plurality of configured primary devices, and a plurality of configured related devices.

60. A method for automating the drawing process for the diagramming of a network solution using a drawing program comprising:
displaying, by a computer, a plurality of graphical user interfaces to obtain a plurality of user inputs defining a plurality of configured virtual local area networks, a plurality of configured virtual local area network groups, a plurality of configured primary devices and a plurality of configured related devices;

selecting a plurality of available virtual local area networks;

configuring a plurality of available virtual local area network groups;

selecting a plurality of available primary devices;

configuring a plurality of selected primary devices by assigning a virtual local area group identification to each of the selected devices; and automatically generating responsive to receiving the plurality of user inputs, a plurality of instructions adapted to cause a separate and independent MICROSOFT VISO® drawing program to create and print the network solution wherein each of the plurality of selected primary devices is connected based upon an assigned virtual local area group identification; and, wherein the MICROSOFT VISO® drawing program generates the diagram of the network solution in response to the plurality of instructions.

61. The method of claim 60 wherein instructing the drawing program to create a diagram of the network solution includes instructions to create a diagram of a plurality of configured primary devices, a plurality of configured related devices, the connectivity of the plurality of configured primary devices, and the connectivity of the plurality of configured related devices.

62. The method of claim 60 further comprising configuring a plurality of available related devices.

63. The method of claim 62 wherein the plurality of available related devices includes a plurality of shared related devices and a plurality of non-shared related devices.

64. The method of claim 60 wherein the step of configuring a plurality of configured primary devices further comprises configuring a plurality of configured related devices.

* * * * *